(12) United States Patent
Kishi

(10) Patent No.: US 11,865,592 B2
(45) Date of Patent: Jan. 9, 2024

(54) CLEANING DEVICE, IMAGING UNIT EQUIPPED WITH CLEANING DEVICE, AND CLEANING METHOD

(71) Applicant: Murata Manufacturing Co., Ltd., Nagaokakyo (JP)

(72) Inventor: Noritaka Kishi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 253 days.

(21) Appl. No.: 17/523,715

(22) Filed: Nov. 10, 2021

(65) Prior Publication Data
US 2022/0193735 A1    Jun. 23, 2022

(30) Foreign Application Priority Data
Oct. 30, 2020 (JP) ................... 2020-182225

(51) Int. Cl.
*B08B 7/02* (2006.01)
*B08B 13/00* (2006.01)
(Continued)

(52) U.S. Cl.
CPC .................. *B08B 7/02* (2013.01); *B08B 3/02* (2013.01); *B08B 7/04* (2013.01); *B08B 13/00* (2013.01);
(Continued)

(58) Field of Classification Search
CPC .. B08B 13/00; B08B 7/02; B08B 7/04; B08B 3/02; B08B 3/12; G02B 27/0006;
(Continued)

(56) References Cited

U.S. PATENT DOCUMENTS

| 2011/0073142 | A1  | 3/2011 | Hattori et al. |
| 2012/0117745 | A1* | 5/2012 | Hattori ................... B60S 1/54 |
| | | | 134/198 |

(Continued)

FOREIGN PATENT DOCUMENTS

| JP | 2011-244417 A | 12/2011 |
| JP | 2012-138768 A |  7/2012 |

(Continued)

OTHER PUBLICATIONS

Machine Translation of WO-2021186898-A1, An, Sep. 2021. (Year: 2021).*

(Continued)

*Primary Examiner* — Benjamin L Osterhout
(74) *Attorney, Agent, or Firm* — Keating & Bennett, LLP

(57) ABSTRACT

A cleaning device includes a protection cover, a vibrator, a piezoelectric driver, and a signal processing circuit. When the signal processing circuit determines that foreign matter is adhered to a surface of the protection cover, it controls the piezoelectric driver such that vibration of the protection cover has a vibration acceleration of about $1.5 \times 10^5$ m/s$^2$. When the signal processing circuit determines that the foreign matter is adhered to the surface of the protection cover when control of the driver such that vibration of the protection cover has a prescribed vibration acceleration, the protection cover is warmed with a warmer. After the protection cover is warmed, the signal processing circuit controls the piezoelectric driver such that vibration of the protection cover has a resonant frequency.

19 Claims, 17 Drawing Sheets

(51) Int. Cl.
  *B08B 3/02* (2006.01)
  *B08B 7/04* (2006.01)
  *B60S 1/02* (2006.01)
  *B60S 1/56* (2006.01)
  *B08B 3/12* (2006.01)
  *G02B 27/00* (2006.01)
  *H04N 23/52* (2023.01)
  *H04N 23/55* (2023.01)

(52) U.S. Cl.
  CPC .............. *B08B 3/12* (2013.01); *B60S 1/026* (2013.01); *B60S 1/56* (2013.01); *G02B 27/0006* (2013.01); *H04N 23/52* (2023.01); *H04N 23/55* (2023.01)

(58) Field of Classification Search
  CPC ........ H04N 23/52; H04N 23/55; B60S 1/026; B60S 1/56
  See application file for complete search history.

(56) References Cited

U.S. PATENT DOCUMENTS

| | | | | |
|---|---|---|---|---|
| 2018/0243804 | A1* | 8/2018 | Magee | ................... B08B 7/028 |
| 2020/0282435 | A1* | 9/2020 | Magee | ............... G02B 27/0006 |
| 2021/0084199 | A1 | 3/2021 | Kishi et al. | |

FOREIGN PATENT DOCUMENTS

| | | | | |
|---|---|---|---|---|
| JP | 2013-080177 A | | 5/2013 | |
| WO | WO-2020158937 A1 | * | 8/2020 | ............... B08B 5/00 |
| WO | WO-2020158938 A1 | * | 8/2020 | ............... B08B 5/00 |
| WO | WO-2020158939 A1 | * | 8/2020 | ............. B60R 11/04 |
| WO | 2020/217600 A1 | | 10/2020 | |
| WO | WO-2020230419 A1 | * | 11/2020 | ............... B60S 1/56 |
| WO | WO-2020230420 A1 | * | 11/2020 | ............. B08B 17/00 |
| WO | WO-2021186898 A1 | * | 9/2021 | ........... B06B 1/0207 |

OTHER PUBLICATIONS

Machine Translation of WO-2020230420-A1, Ishii, Nov. 2020. (Year: 2020).*
Machine Translation of WO-2020230419-A1, Fujimoto, Nov. 2020. (Year: 2020).*
Machine Translation of WO-2020158939-A1, Matsunaga, Aug. 2020. (Year: 2020).*
Machine Translation of WO-2020158938-A1, Matsunaga, Aug. 2020. (Year: 2020).*
Machine Translation of WO-2020158937-A1, Matsunaga, Aug. 2020. (Year: 2020).*
Official Communication issued in International Patent Application No. PCT/IB2021/060382, dated Jan. 25, 2022.

* cited by examiner

CLEANING DEVICE, IMAGING UNIT EQUIPPED WITH CLEANING DEVICE, AND CLEANING METHOD

CROSS REFERENCE TO RELATED APPLICATIONS

This application claims the benefit of priority to Japanese Patent Application No. 2020-182225 filed on Oct. 30, 2020. The entire contents of this application are hereby incorporated herein by reference.

BACKGROUND OF THE INVENTION

1. Field of the Invention

The present invention relates to a cleaning device, an imaging unit including the cleaning device, and a cleaning method.

2. Description of the Related Art

An imaging unit is provided in a front portion or a rear portion of a vehicle, and an image picked up by the imaging unit is used to control a safety device and autonomous driving. Since such an imaging unit is often provided outside a vehicle, foreign matter such as raindrops, mud, or dust may adhere to a translucent body (a lens or protection glass) that covers the outside. With adhesion of the foreign matter to the translucent body, the foreign matter that adheres is reflected in the image picked up by the imaging unit and a clear image is not obtained.

A cleaning device that detects foreign matter that is adhered to a surface of a translucent body and removes the foreign matter by vibrating the translucent body has been developed (see, for example, Japanese Patent Laid-Open No. 2012-138768). A cleaning device that removes a foreign matter by discharging a washer fluid to a surface of a translucent body and vibrating the translucent body has been developed (see, for example, Japanese Patent Laid-Open No. 2011-244417).

The cleaning device described in Japanese Patent Laid-Open No. 2012-138768, however, simply vibrates the translucent body and may not be able to remove muddy water or the like. Specifically, with the cleaning device, in some cases, moisture in muddy water is atomized by vibration of the translucent body which leads to an increase in concentration of mud in muddy water, and muddy water or the like is not successfully removed.

The cleaning device described in Japanese Patent Laid-Open No. 2011-244417 can remove foreign matter on a translucent body by combining vibration of the translucent body and discharge of a washer fluid. However, in actual use, primarily only raindrops are received as foreign matter that is adhered to the translucent body and mud hardly adheres. Since the cleaning device described in Japanese Patent Laid-Open No. 2011-244417 discharges the washer fluid even in the case of adhesion of droplets or a small amount of mud as the foreign matter on the translucent body, an amount of consumed washer fluid increases and efficiency in cleaning is low.

SUMMARY OF THE INVENTION

Preferred embodiments of the present invention provide cleaning devices that are each able to efficiently remove foreign matter that is adhered to a translucent body, imaging units each including such a cleaning device, and cleaning methods.

A cleaning device according to a preferred embodiment of the present invention includes a translucent body in a field of view of an imaging device, a vibrator to vibrate the translucent body, a driver to drive the vibrator, a determiner to determine whether a foreign matter is adhered to a surface of the translucent body, a warmer to warm the translucent body, and a controller to control the driver and the warmer. When the determiner determines that the foreign matter is adhered to the surface of the translucent body, the controller controls the driver such that vibration of the translucent body has a vibration acceleration of about $1.5 \times 10^5$ m/s². When the determiner determines that the foreign matter is adhered to the surface of the translucent body when the controller controls the driver such that vibration of the translucent body has a prescribed vibration acceleration, the controller controls the warmer to warm the translucent body. After the translucent body is warmed, the controller controls the driver such that vibration of the translucent body has a resonant frequency.

A cleaning device according to a preferred embodiment of the present invention includes a translucent body in a field of view of an imaging device, a vibrator to vibrate the translucent body, a driver to drive the vibrator, a determiner to determine whether foreign matter is adhered to a surface of the translucent body, and a controller to control the driver. When the determiner determines that the foreign matter is adhered to the surface of the translucent body, the controller controls the driver such that vibration of the translucent body has a vibration acceleration of about $1.5 \times 10^5$ m/s². When the determiner determines that the foreign matter is adhered to the surface of the translucent body when the controller controls of the driver such that vibration of the translucent body has a prescribed vibration acceleration at a resonant frequency, the controller controls the driver such that vibration of the translucent body has a higher-order resonant frequency. After the translucent body is vibrated at the higher-order resonant frequency, the controller controls the driver such that vibration of the translucent body has a resonant frequency.

An imaging unit according to a preferred embodiment of the present invention includes an imaging device and a cleaning device according to a preferred embodiment of the present invention.

A cleaning method according to a preferred embodiment of the present invention is a method of cleaning a surface of a translucent body with a cleaning device, the cleaning device including a translucent body in a field of view of an imaging device, a vibrator to vibrate the translucent body, a driver to drive the vibrator, and a warmer to warm the translucent body. The cleaning method includes determining whether foreign matter is adhered to the surface of the translucent body, controlling the driver such that vibration of the translucent body has a vibration acceleration of about $1.5 \times 10^5$ m/s² when it is determined that the foreign matter is adhered to the surface of the translucent body, warming the translucent body with the warmer when it is determined that the foreign matter is adhered to the surface of the translucent body when the driver is controlled such that vibration of the translucent body has a prescribed vibration acceleration, and controlling, after the translucent body is warmed, the driver such that vibration of the translucent body has a resonant frequency.

The above and other elements, features, steps, characteristics and advantages of the present invention will become

DETAILED DESCRIPTION OF THE PREFERRED EMBODIMENTS

Figure 1:
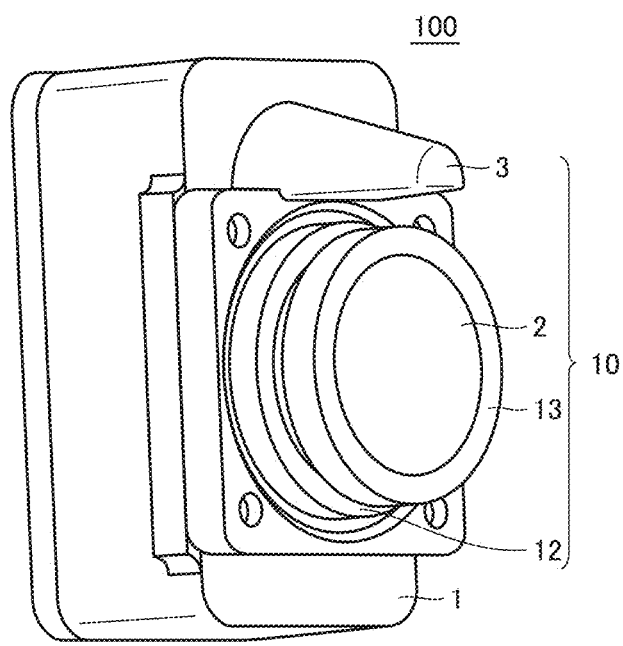
FIG. 1 is a perspective view of an imaging unit according to a first preferred embodiment of the present invention.

Imaging units according to preferred embodiments of the present invention will be described in detail below with reference to the drawings. The same or corresponding elements in the drawings are denoted by the same reference characters.

First Preferred Embodiment

Figure 2:
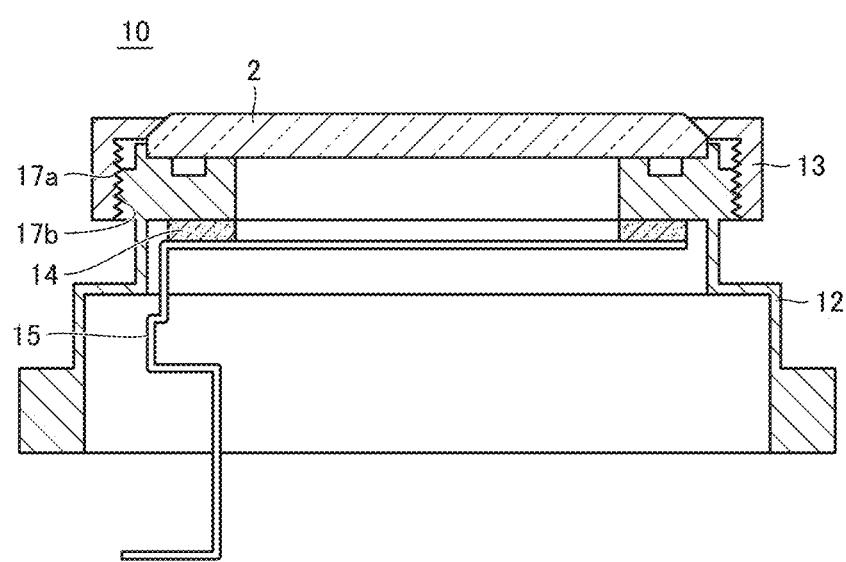
FIG. 2 is a schematic cross-sectional view showing a cross-sectional construction of a cleaning device according to the first preferred embodiment of the present invention.
Figure 3:
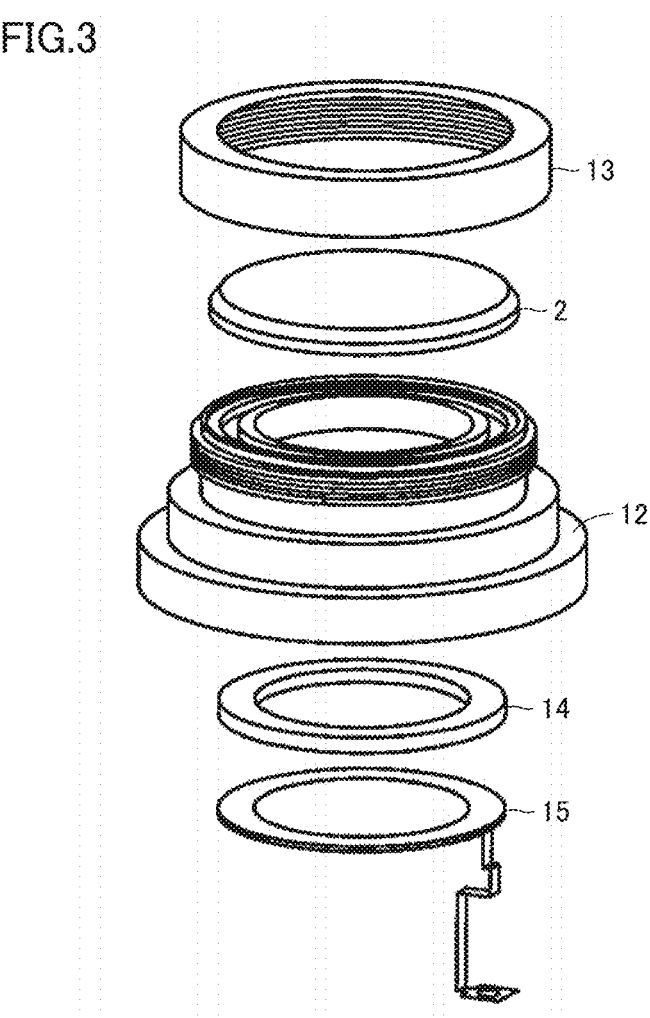
FIG. 3 is an exploded perspective view showing each member of the cleaning device according to the first preferred embodiment of the present invention.
Figure 4:
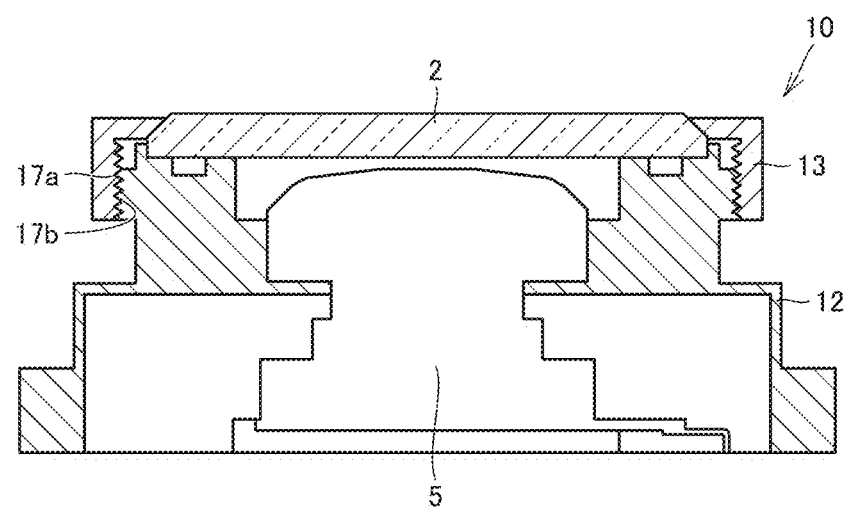
FIG. 4 is a schematic cross-sectional view showing a cross-sectional construction of the imaging unit in which the cleaning device according to the first preferred embodiment of the present invention is provided in an imaging device.

An imaging unit according to a first preferred embodiment of the present invention will be described below with reference to the drawings. FIG. 1 is a perspective view of an imaging unit 100 according to the first preferred embodiment. FIG. 2 is a schematic cross-sectional view showing a cross-sectional construction of a cleaning device 10 according to the first preferred embodiment. FIG. 3 is an exploded perspective view showing each constituent member of cleaning device 10 according to the first preferred embodiment. FIG. 4 is a schematic cross-sectional view showing a cross-sectional construction of imaging unit 100 in which cleaning device 10 according to the first preferred embodiment is arranged in an imaging device 5.

Portions except for imaging device 5 shown in FIG. 4 in imaging unit 100 shown in FIG. 1 define a cleaning device 10. Cleaning device 10 cleans a range of imaging by imaging device 5 by removing foreign matter that is adhered to a protection cover 2 provided on a front surface of imaging device 5.

Cleaning device 10 according to the first preferred embodiment includes a component that removes foreign matter that is adhered by vibrating protection cover 2 and a component that removes foreign matter that is adhered by discharging a cleaning solution (cleaner) to protection cover 2. A vibrator 12 provided in a housing 1 removes foreign matter that is adhered by vibrating protection cover 2 and a cleaning nozzle 3 that discharges a cleaning solution to protection cover 2 removes foreign matter that is adhered by discharging the cleaning solution to protection cover 2. Cleaning device 10 may include only vibrator 12 that vibrates protection cover 2, without including cleaning nozzle 3.

The component of cleaning device 10 that removes foreign matter that is adhered by vibrating protection cover 2 will be described in further detail below. Cleaning device 10 includes protection cover 2, vibrator 12 that vibrates protection cover 2, and a retainer 13 that supports protection cover 2 around an outer circumferential edge. Vibrator 12 is bonded to protection cover 2 with an adhesive. The adhesive is a hard material such as, for example, an epoxy resin. The adhesive preferably has a high Young's modulus to reduce loss of vibration. Retainer 13 is bonded to protection cover 2 with an adhesive, fixed to vibrator 12, and is in contact with the outer circumferential edge of protection cover 2 to support protection cover 2.

Protection cover 2 includes an end held at an end of cylindrical vibrator 12. Vibrator 12 includes a hollow annular piezoelectric body 14 on a surface opposite to a surface in contact with protection cover 2. Piezoelectric body 14 includes a line 15 including a hollow annular electrode on a surface opposite to a surface in contact with vibrator 12. By applying a voltage to line 15 to vibrate piezoelectric body 14 in a direction of passage through cylindrical vibrator 12, protection cover 2 can be vibrated through vibrator 12 in the direction of passage through vibrator 12.

As shown in FIG. 2, vibrator 12 includes a first cylindrical body in contact with protection cover 2 and a second cylindrical body connected to the first cylindrical body with a projecting portion interposed therebetween. The first cylindrical body includes on one end, a portion where protection cover 2 and piezoelectric body 14 are to be provided, and includes on the other end, the projecting portion extending in an annularly surrounding shape. The projecting portion supports a bottom surface of the first cylindrical body and extends outward from the position of support. The projecting portion is supported by the second cylindrical body at a position on an outer side of the position where it supports the first cylindrical body. The second cylindrical body includes an annularly surrounding ring-shaped base at an end opposite to the position where it supports the projecting portion. The position of piezoelectric body 14 provided in vibrator 12 is not limited to the position shown in FIG. 2 and piezoelectric body 14 may be provided, for example, on a lower surface of the ring-shaped base of the second cylindrical body. Instead of hollow annular piezoelectric body 14, a plurality of rectangular or substantially rectangular piezoelectric bodies may be concentrically provided.

Cleaning device 10 is configured, for example, such that protection cover 2 covers a front surface of an optical element of imaging device 5 as shown in FIG. 4. Cleaning device 10 of imaging unit 100 is thus provided. Imaging device 5 includes, for example, an optical element, an imaging element, and a sensor component and includes a casing component in which they are accommodated.

According to cleaning device 10, when fixing protection cover 2 and vibrator 12 to each other, both of an adhesive and mechanical fixing are used to securely hold protection cover 2 and vibrator 12 and to reduce or prevent loss of vibration.

Protection Cover

Protection cover 2 is made of a material such as, for example, soda glass, borosilicate glass, or aluminosilicate glass. Protection cover 2 may be made of strengthened glass improved in strength by chemical strengthening. The surface of protection cover 2 may be coated with, for example, an AR coating, a water-repellent coating, or a shock-resistant coating as necessary. Although protection cover 2 has an annular two-dimensional shape, a shape thereof is not limited thereto. The protection cover may have a polygonal shape such as, for example, a quadrangular or substantially quadrangular shape, a hexagonal or substantially hexagonal shape, or an octagonal or substantially octagonal shape, or an elliptical or substantially elliptical shape. Furthermore, for example, instead of the two-dimensional shape, protection cover 2 may have a hemispherical or substantially hemispherical shape, a shape in which a cylinder is connected to a hemisphere, or a curved shape smaller than a hemisphere.

Vibrator

Vibrator 12 is threaded to include a male thread 17a. Vibrator 12 is made of a metal material such as, for example, stainless steel, aluminum, iron, titanium, or duralumin. In order to reduce loss of vibration, vibrator 12 preferably has a rigidity as high as possible. The surface of vibrator 12 is preferably subjected to, for example, oxidation treatment or alumite treatment in order to improve adhesiveness of an adhesive. Vibrator 12 receives vibration from piezoelectric body 14.

Retainer

Retainer 13 is threaded to include a female thread 17b. Female thread 17b is designed to be fitted to male thread 17a of vibrator 12 and retainer 13 is fastened by being turned. Retainer 13 may be made of not only a metal such as, for example, stainless steel, aluminum, iron, titanium, or duralumin but also of plastic. A surface state of retainer 13 is the same as or similar to that of vibrator 12. Retainer 13 does not necessarily have to be threaded. As long as retainer 13 can be securely fixed to vibrator 12, various structures such as, for example, permanent set and laser welding are available.

When a material having a larger specific gravity than protection cover 2 is used for retainer 13, the position of the center of gravity can be located on an outer side of an outer circumference of protection cover 2, so that adjustment such as an increase in range of amplitude of protection cover 2 can be made.

Piezoelectric Body

Piezoelectric body 14 is fixed to vibrator 12 with an adhesive. Piezoelectric body 14 is made of a material such as, for example, ceramics. In order to provide a potential to an electrode in a lower portion of piezoelectric body 14, line 15 is fixed to piezoelectric body 14 with an adhesive. Line 15 is made, for example, of a highly conductive metal such as stainless steel or copper. Line 15 may be provided on a flexible printed circuit (FPC). The FPC is a widely used technique, and a representative FPC is made by forming a line with a copper foil on a polyimide substrate, for example. Piezoelectric body 14 is ultrasonically vibrated. Therefore, when a line made of stainless steel or copper is directly bonded to the piezoelectric body, loss of vibration may be caused. On the other hand, since the FPC is flexible, a potential can be provided to piezoelectric body 14 without interference with vibration. Stress applied to piezoelectric body at the time of vibration displacement may be reduced by peripheral components. Displacement of protection cover 2 thus linearly increases with an input voltage to piezoelectric body 14, and satisfactory performance in removal of foreign matter is achieved.

Cleaning Nozzle

The construction of cleaning device 10 that removes foreign matter that is adhered by discharging a cleaning solution to protection cover 2 will now be described. Housing 1 is provided with cleaning nozzle 3 including an opening from which the cleaning solution is discharged to protection cover 2 as shown in FIG. 1. Cleaning nozzle 3 has a cylindrical or substantially cylindrical shape. Being supplied with the cleaning solution from an end opposite to the opening, cleaning nozzle 3 discharges the cleaning solution from the opening to an end of protection cover 2. A tip end of cleaning nozzle 3 is located outside a range of imaging by (a field of view of) imaging device 5 and the opening is not at a position where it is reflected in an image picked up by imaging device 5. Although a single cleaning nozzle 3 is provided in housing 1 in the first preferred embodiment, a plurality of cleaning nozzles 3 may be provided in housing 1. Alternatively, cleaning device 10 may have another configuration (for example, an air blower) in addition to or instead of cleaning nozzle 3.

Figure 5:
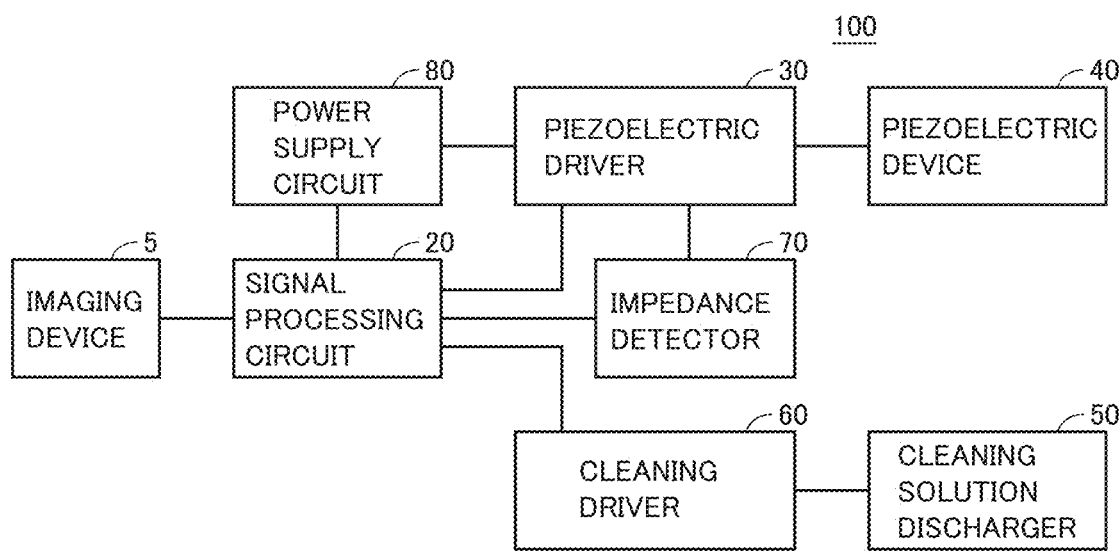
FIG. 5 is a block diagram for illustrating control of the cleaning device in the imaging unit according to the first preferred embodiment of the present invention.

Control of the cleaning device will now be described with reference to the drawings. FIG. 5 is a block diagram for illustrating control of the cleaning device in imaging unit 100 according to the present preferred embodiment.

Imaging unit 100 includes imaging device 5, a signal processing circuit 20, a piezoelectric driver 30, a piezoelectric device 40, a cleaning solution discharger 50, a cleaning driver 60, an impedance detector 70, and a power supply circuit 80. Signal processing circuit 20 defines and functions as a controller that processes an imaging signal from imaging device 5 and supplies a control signal to piezoelectric driver 30 and cleaning driver 60.

Signal processing circuit 20 also defines and functions as a determiner that determines whether or not foreign matter is adhered to the surface of protection cover 2 based on a resonant frequency and a current value measured by impedance detector 70. Signal processing circuit 20 may determine whether or not foreign matter is adhered to the surface of protection cover 2 based on a change of an image picked up by imaging device 5. Furthermore, signal processing circuit 20 also defines and functions as a warmer that warms protection cover 2 by vibrating vibrator 12 at a resonant frequency of a harmonic. For cleaning solution discharger 50, a feature that discharges a cleaning solution from the opening of cleaning nozzle 3 is shown as one block.

Signal processing circuit 20 includes a central processing unit (CPU) as a control center, a read only memory (ROM) where a program and control data for operations of the CPU are stored, a random access memory (RAM) that defines and functions as a work area of the CPU, and an input and output interface to maintain signal compatibility with peripheral devices.

Piezoelectric driver 30 generates an alternating-current (AC) output signal at a frequency f and a voltage V in accordance with a control signal from signal processing circuit 20 and a drive voltage. Piezoelectric device 40 includes vibrator 12 including piezoelectric body 14 shown in FIG. 2, and removes foreign matter by vibrating vibrator 12 and protection cover 2 by applying an AC output signal to piezoelectric body 14.

Other than removal of foreign matter that is adhered to protection cover 2 by vibrating protection cover 2, vibrator 12 can warm protection cover 2 by vibrating protection cover 2 and using mechanical loss of vibration. Signal processing circuit 20 includes protection cover 2 warmed with heat generated in vibrator 12 by supplying a control signal to piezoelectric driver 30 to vibrate protection cover 2 at a resonant frequency of a harmonic, rather than a resonant frequency of a fundamental wave. Electric energy for vibrating protection cover 2 is converted to heat in addition to mechanical vibration. By vibrating protection cover 2, heat generation by mechanical loss of vibration in piezoelectric driver 30, heat generation by dielectric loss, and heat generation by mechanical loss of vibration in protection cover 2 simultaneously occur, and thus efficiency in heating of protection cover 2 is improved. In particular, vibration of protection cover 2 at a resonant frequency of a harmonic is larger in number of times of vibration of piezoelectric driver 30 and protection cover 2 than vibration of protection cover 2 at a resonant frequency of a fundamental wave. Therefore, heat generation by mechanical loss of vibration in piezoelectric driver 30 and protection cover 2 increases. In other words, as energy of vibration is higher, an amount of heat generation is larger.

Figure 6:
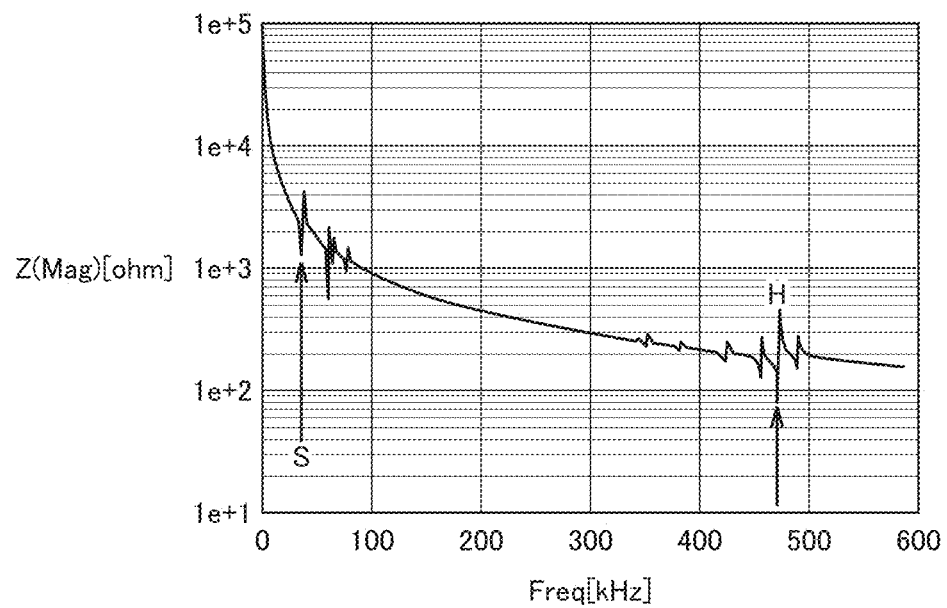
FIG. 6 shows frequency characteristics of a vibrator of the cleaning device according to the first preferred embodiment of the present invention.

FIG. 6 shows frequency characteristics of vibrator 12 of cleaning device 10 according to the first preferred embodiment. The abscissa in FIG. 6 represents a frequency (kHz) and the ordinate represents an impedance (ohm). As shown in FIG. 6, a fundamental wave S (primary) of vibrator 12 has a resonant frequency of about 40 kHz, which allows vibration of protection cover 2 at an amplitude of several ten micrometers. The vibration can produce capillary waves in foreign matter (droplet) that is adhered to protection cover 2, and the capillary waves can atomize the foreign matter. A harmonic H (higher-order) has a resonant frequency of about 470 kHz, an amplitude of protection cover 2 is as small as about 1/20 of fundamental wave S, and a droplet that is adhered to protection cover 2 cannot be atomized. Harmonic H, however, is about 100 times as high in frequency as fundamental wave S, and thus vibration energy thereof is high.

In general, vibration energy is in proportion to a square of an amplitude and a frequency. Therefore, vibration energy in vibration of vibrator 12 by harmonic H is about 25 times as high as vibration energy in vibration of vibrator 12 by fundamental wave S. Although protection cover 2 can be warmed using vibration energy of harmonic H, the amplitude of protection cover 2 is smaller, and thus deterioration of a coating on protection cover 2 due to friction against mud particles included in a droplet can be reduced or prevented. Thus, by using harmonic H to vibrate protection cover 2, protection cover 2 can be warmed while the coating on protection cover 2 is protected, and a mud component in foreign matter that is adhered to protection cover 2 can be dried. When warming protection cover 2 by vibrating protection cover 2 by using harmonic H, protection cover 2 can be quickly warmed even when protection cover 2 is made of a material with a low specific heat.

Signal processing circuit 20 can generate a control signal to discharge the cleaning solution to protection cover 2 for cleaning. Cleaning driver 60 controls cleaning solution discharger 50 to discharge the cleaning solution to protection cover 2 based on the control signal from signal processing circuit 20.

Impedance detector 70 monitors a current in piezoelectric driver 30 while an AC output signal is applied to piezoelectric body 14 to operate piezoelectric device 40.

Figure 7:
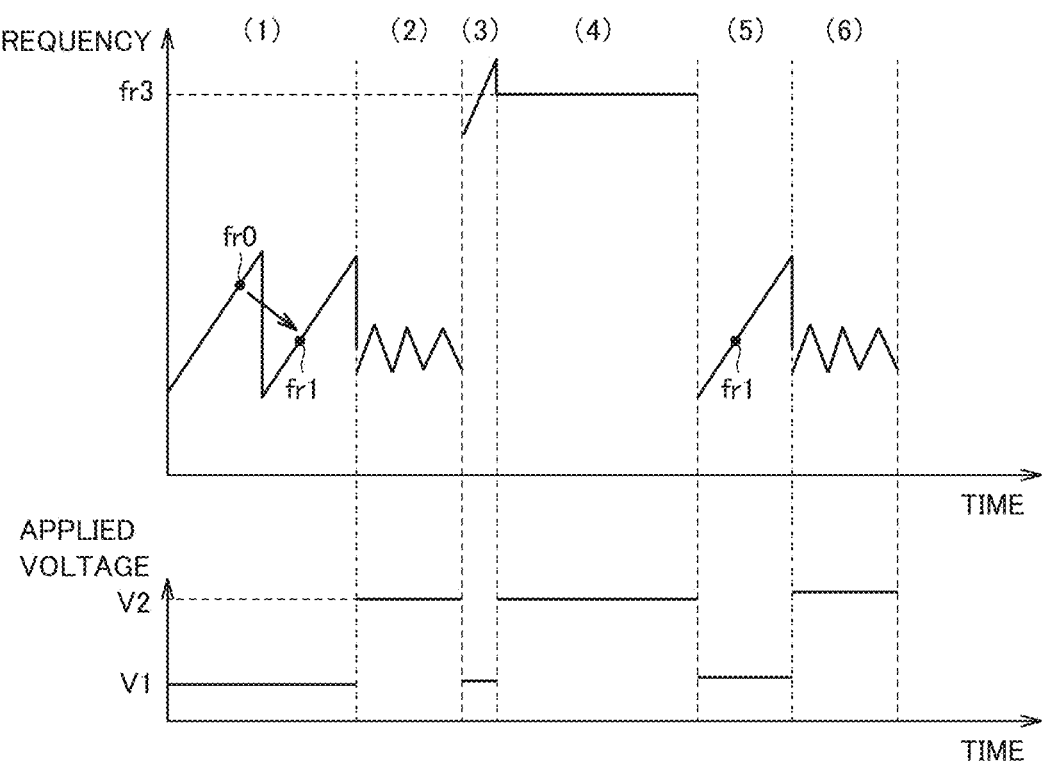
FIG. 7 is a transition diagram of operation modes for illustrating operations of the cleaning device in the imaging unit according to the first preferred embodiment of the present invention.
Figure 8:
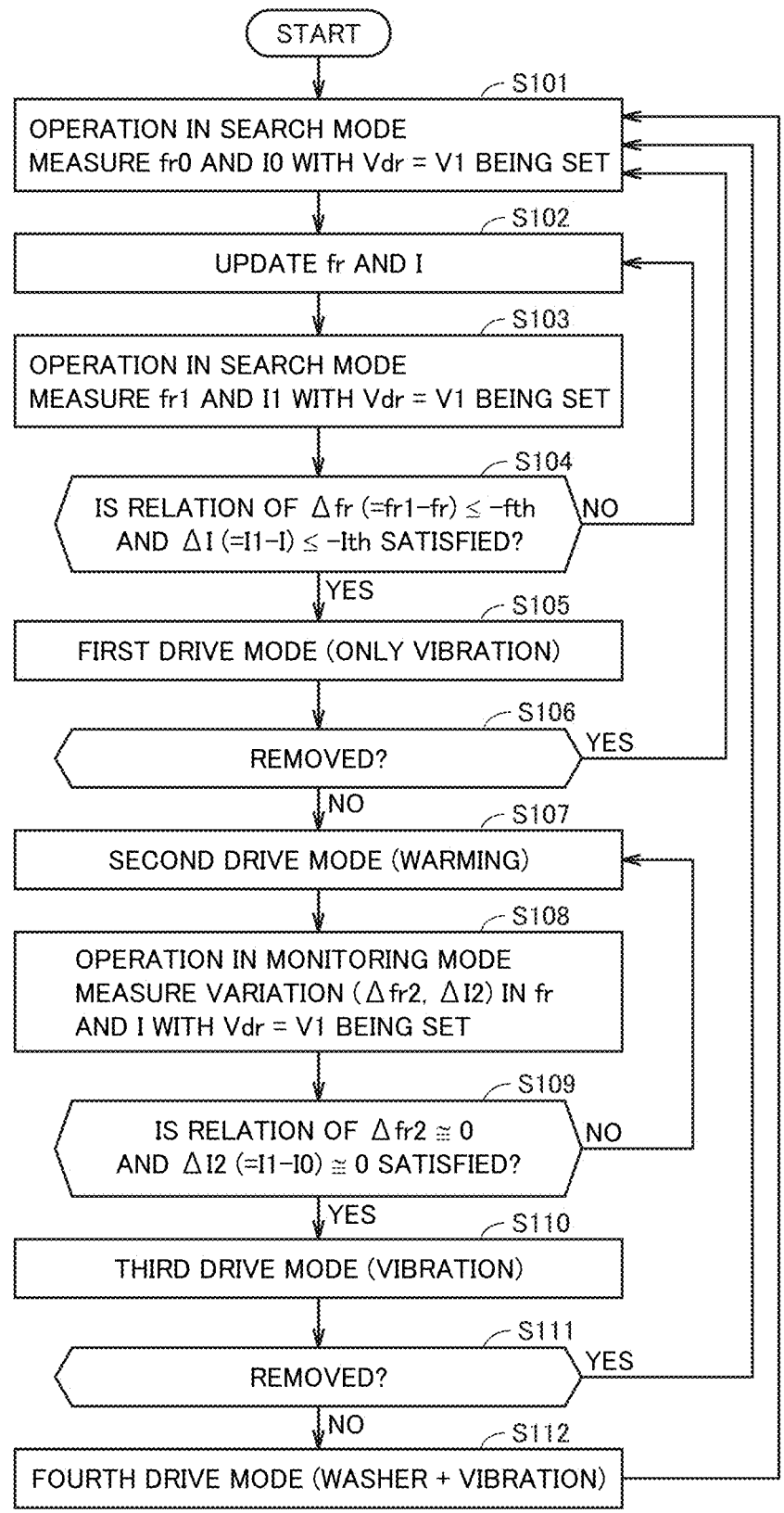
FIG. 8 is a flowchart for illustrating operations of the cleaning device in the imaging unit according to the first preferred embodiment of the present invention.

Operations of cleaning device 10 in imaging unit 100 will now be described with reference to a transition diagram and a flowchart. FIG. 7 is a transition diagram of operation modes for illustrating operations of cleaning device 10 in imaging unit 100 according to the first preferred embodiment. FIG. 8 is a flowchart for illustrating operations of cleaning device 10 in imaging unit 100 according to the first preferred embodiment. Initially, signal processing circuit 20 controls piezoelectric device 40 to operate in a search mode and determines whether or not foreign matter is adhered to the surface of protection cover 2. In order to have piezoelectric device 40 operate in the search mode, piezoelectric driver 30 applies an AC output signal to piezoelectric body 14 with a drive voltage Vdr being set to V1 and with a frequency f being swept. From a point of view of reducing or preventing heat generation, the AC output signal applied to piezoelectric body 14 is preferably low in drive voltage Vdr.

Impedance detector 70 monitors the current in piezoelectric driver 30 while piezoelectric device 40 operates in the search mode with drive voltage Vdr being set to V1 and with frequency f being swept. Specifically, impedance detector 70 measures as an initial resonant frequency fr0, a frequency among swept frequencies f at which a current in piezoelectric driver 30 is highest (or an impedance which is an inverse of a current value is smallest), and measures a current at that time as a current value I0 (step S101). Signal processing circuit 20 updates the memory with measured initial resonant frequency fr0 and current value I0 being set as a frequency fr and a current value I as reference values (step S102).

Signal processing circuit 20 can accurately determine whether a change in resonant frequency of piezoelectric device 40 and a change in smallest impedance (a minimum value of the impedance) of piezoelectric device 40 are caused by adhesion of foreign matter to the surface of protection cover 2 or by temperature change, by considering the combination thereof. Therefore, signal processing circuit 20 does not determine whether or not foreign matter is adhered to the surface of protection cover 2 only based on the resonant frequency but determines whether or not the foreign matter is adhered to the surface of protection cover 2 based on the resonant frequency and the current value (or the impedance which is the inverse of the current value). In other words, signal processing circuit 20 determines whether or not the foreign matter is adhered to the surface of protection cover 2 based on a change in resonant frequency while piezoelectric device 40 operates in the search mode and a change in current value at that time and excludes a change in resonant frequency of piezoelectric device 40 due to temperature change.

After a certain time period (for example, after one second), in order to have piezoelectric device 40 operate in the search mode, piezoelectric driver 30 applies an AC output signal to piezoelectric body 14 with drive voltage Vdr being set to V1 and with frequency f being swept. Then, impedance detector 70 measures as a resonant frequency fr1, a frequency among swept frequencies f at which the current in piezoelectric driver 30 is highest and measures a current at that time as a current value I1 (step S103).

Signal processing circuit 20 calculates difference values between frequency fr and current value I as the reference values updated in step S102 and resonant frequency fr1 and current value I1, and compares the difference values with predetermined threshold values fth and Ith (step S104). Specifically, signal processing circuit 20 determines whether or not a relationship of $\Delta fr$ (=fr1−fr)≤−fth and $\Delta I$ (=I1−I)≤−Ith is satisfied. In other words, when an amount of change ($\Delta fr$) of decrease in resonant frequency is not larger than threshold value fth and an amount of change ($\Delta I$) of decrease in current value is not larger than threshold value Ith, signal processing circuit 20 determines that the foreign matter is adhered to the surface of protection cover 2. In the search mode (1) shown in FIG. 7, the measured resonant frequency decreases from resonant frequency fr0 to resonant frequency fr1 and determination that the foreign matter is adhered to the surface of protection cover 2 is made.

As described previously, signal processing circuit 20 does not determine that the foreign matter is adhered to the surface of protection cover 2 only based on the amount of change (change over time) in resonant frequency but determines whether or not the foreign matter is adhered to the surface of protection cover 2 based on the amount of change (change over time) in current value which is a value relating to the impedance.

When the difference values are larger than predetermined threshold values fth and Ith (NO in step S104), signal processing circuit 20 returns the process to step S102 and updates the memory with resonant frequency fr1 and current value I1 measured in step S104 being set as frequency fr and current value I as the reference values.

When the difference values are not larger than predetermined threshold values fth and Ith (YES in step S104), signal processing circuit 20 determines that the foreign matter is adhered to the surface of protection cover 2. When signal processing circuit 20 determines that the foreign matter is adhered to the surface of protection cover 2, in order to have piezoelectric device 40 operate in a first drive mode, piezoelectric driver 30 applies to piezoelectric body 14, an AC output signal that indicates setting of drive voltage Vdr to V2 (>V1) and setting of a drive frequency fdr to resonant frequency fr1 of the fundamental wave (step S105). The first drive mode (2) shown in FIG. 7 is the drive mode in which cleaning driver 60 is not driven and only piezoelectric driver 30 is driven, and drive voltage Vdr is set to V2 and drive frequency fdr is set to resonant frequency fr1 of the fundamental wave.

When it is determined that the foreign matter is adhered to the surface of protection cover 2, by vibrating protection cover 2 in the first drive mode, the foreign matter that is adhered to the surface of protection cover 2 can be atomized or slipped down. When protection cover 2 is vibrated in the first drive mode, the foreign matter that is adhered to the surface of protection cover 2 is gathered in a central portion of protection cover 2 which is an antinode of vibration, and thereafter atomized or slipped down. In order to atomize or slip down the foreign matter that is adhered to the surface of protection cover 2, signal processing circuit 20 should control piezoelectric driver 30 such that vibration of protection cover 2 has a prescribed vibration acceleration. For example, signal processing circuit 20 controls piezoelectric driver 30 such that vibration of protection cover 2 has the vibration acceleration of about $1.5 \times 10^5$ m/s$^2$.

Figure 9:
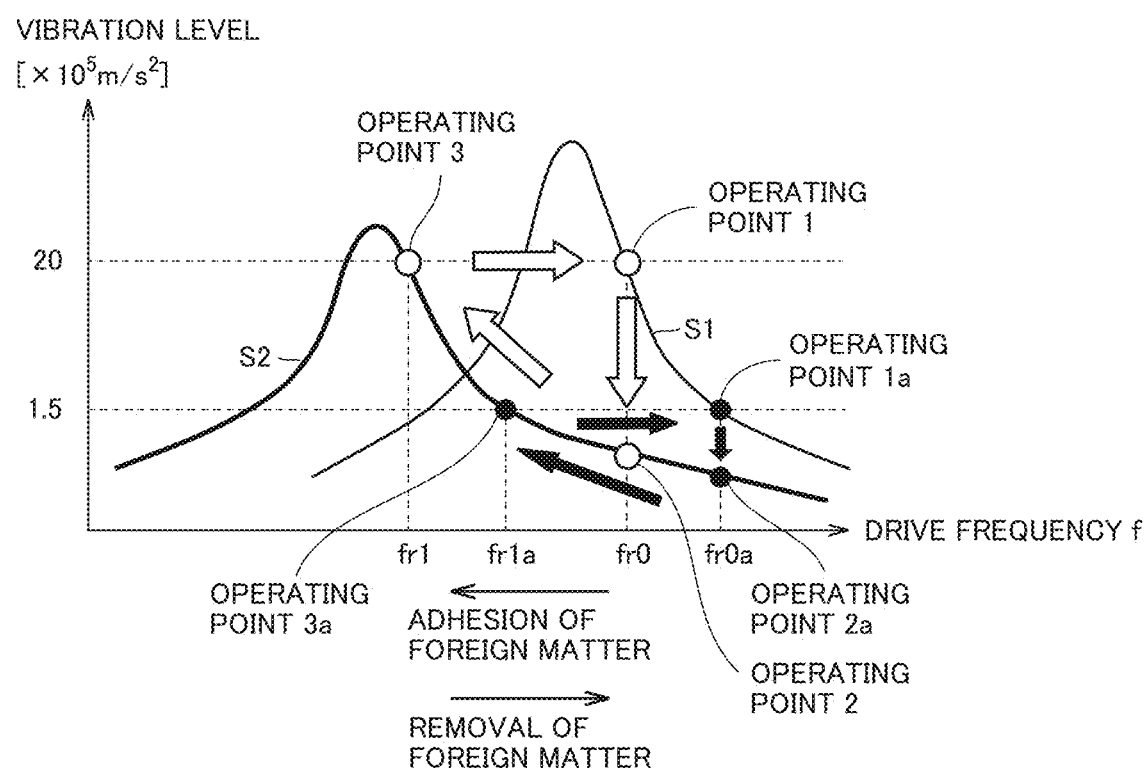
FIG. 9 is a diagram for illustrating driving to remove foreign matter by vibration in the cleaning device in the imaging unit according to the first preferred embodiment of the present invention.

Drive for atomizing or slipping down a foreign matter that is adhered to the surface of protection cover 2 will specifically be described with reference to the drawings. FIG. 9 is a diagram for illustrating driving to remove foreign matter by vibration in cleaning device 10 in imaging unit 100 according to the first preferred embodiment. In FIG. 9, the abscissa represents drive frequency f and the ordinate represents an acceleration (unit of $\times 10^5$ m/s$^2$) representing a vibration level.

Initially, signal processing circuit 20 controls piezoelectric driver 30 such that a signal detected by impedance detector 70 matches a target value of the vibration level of protection cover 2 set in advance. Therefore, signal processing circuit 20 may include an amplifier circuit that amplifies a signal detected by impedance detector 70, an AD circuit that converts a signal amplified by the amplifier circuit into a digital signal, and a PID control circuit, although they are not shown. The vibration level of protection cover 2 is expressed, for example, by an acceleration of displacement in the central portion of protection cover 2. The vibration level of protection cover 2 is not limited thereto, and an amount of displacement in the central portion of protection cover 2 may be applicable.

Under PID control by signal processing circuit 20, a frequency is adjusted in accordance with three factors of proportionality, integration, and differentiation of a difference between a signal from impedance detector 70 and a target value for feedback control of a drive signal of piezoelectric driver 30. Control of the drive signal of piezoelectric driver 30 is not limited to PID control, and any control is applicable as long as a signal detected by impedance detector 70 can be controlled to match with the target value of the vibration level of protection cover 2 set in advance.

Although the vibration level of protection cover 2 is described as being detected by impedance detector 70, a vibration sensor that detects a vibration level of protection cover 2 may be separately provided. The vibration sensor operates as a detector that detects a signal relating to the vibration level of protection cover 2 vibrated by piezoelectric body 14. The vibration sensor is, for example, an ultrasonic sensor or a microphone, and is not in contact with protection cover 2. In another configuration, a piezoelectric body may be provided in a portion of protection cover 2 and a voltage generated by deformation of the piezoelectric body may be sensed.

Exemplary control of piezoelectric driver 30 such that vibration of protection cover 2 has a prescribed vibration acceleration will be described with reference to FIG. 9. Initially, in vibrating protection cover 2 in an atomization mode, signal processing circuit 20 controls piezoelectric driver 30 such that vibration of protection cover 2 has, for example, a vibration acceleration of about $20 \times 10^5$ m/s$^2$. When foreign matter is adhered to protection cover 2 during vibration of protection cover 2 at drive frequency fr0, the vibration level becomes lower and an operating point moves from an operating point 1 to an operating point 2. In other words, a vibration mode is switched from a vibration mode S1 of protection cover 2 to which no foreign matter is adhered to a vibration mode S2 of protection cover 2 to which foreign matter is adhered.

In order to set vibration of protection cover 2 that is lowered to the vibration level at operating point 2 back to a target vibration level having the vibration acceleration=about $20\times10^5$ m/s$^2$, signal processing circuit 20 adjusts an amplitude voltage or a duty ratio of a drive signal supplied from piezoelectric driver 30 to piezoelectric body 14. Specifically, signal processing circuit 20 performs PID control to adjust the frequency in order to achieve the target vibration level under a condition of the amplitude voltage or the duty ratio of the drive signal designated in mode switching. At an operating point 3 where protection cover 2 to which the foreign matter is adhered is vibrated at the vibration acceleration=about $20\times10^5$ m/s$^2$, the drive frequency lowers from drive frequency fr0 to drive frequency fr1.

At operating point 3, as protection cover 2 to which the foreign matter is adhered is vibrated at the vibration acceleration about $20\times10^5$ m/s$^2$, the foreign matter that is adhered to protection cover 2 is atomized by vibration and removed. When the foreign matter is removed from protection cover 2 during vibration of protection cover 2 to which the foreign matter adheres at the vibration acceleration=about $20\times10^5$ m/s$^2$, the drive frequency is lowered and the operating point moves from operating point 3 to operating point 1. In other words, the vibration mode is switched from vibration mode S2 of protection cover 2 to which the foreign matter is adhered to vibration mode S1 of protection cover 2 to which no foreign matter is adhered.

In vibrating protection cover 2 in a slip-down mode, signal processing circuit 20 controls piezoelectric driver 30 such that vibration of protection cover 2 has the vibration acceleration of about $1.5\times10^5$ m/s$^2$. In vibrating protection cover 2 in the slip-down mode, as shown in FIG. 9, the operating point moves in the order of an operating point 1a, an operating point 2a, an operating point 3a, and an operating point 1a, and the drive frequency changes in the order of a drive frequency fr0a, a drive frequency fr1a, and a drive frequency fr0a. With such change, signal processing circuit 20 can maintain vibration of protection cover 2 in the slip-down mode at the vibration acceleration of about $1.5\times10^5$ m/s$^2$.

However, when the foreign matter that is adhered to the surface of protection cover 2 is an insoluble foreign matter including finite particles such as mud, it is difficult to completely remove the foreign matter simply by control of piezoelectric driver 30 by signal processing circuit 20 such that vibration of protection cover 2 has a prescribed vibration acceleration. When vibration is unduly continued, vibration of mud particles in the foreign matter may damage the surface of protection cover 2 or may scrape off the provided coating. Furthermore, when slipping down the foreign matter from the surface of protection cover 2, it is difficult to completely slip down a highly viscous foreign matter (droplet).

When resonant frequency fr1 does not change when vibration of protection cover 2 in the first drive mode is performed for a predetermined time period, signal processing circuit 20 can determine that the foreign matter that is adhered to the surface of protection cover 2 has not been successfully removed. In other words, signal processing circuit 20 determines whether or not the foreign matter that is adhered to the surface of protection cover 2 has successfully been removed based on the measured resonant frequency (step S106).

When signal processing circuit 20 determines that the foreign matter that is adhered to the surface of protection cover has been successfully removed (YES in step S106), signal processing circuit 20 returns the process to step S101 and sets drive back to the search mode. When signal processing circuit 20 determines that the foreign matter that is adhered to the surface of protection cover 2 has not been successfully removed (NO in step S106), signal processing circuit 20 controls piezoelectric device 40 to operate in a second drive mode (warming mode). Specifically, in order to have piezoelectric device 40 operate in the second drive mode, piezoelectric driver 30 applies to piezoelectric body 14, an AC output signal to set drive voltage Vdr to V2 and set drive frequency fdr to a resonant frequency fr3 (<fr1) of a harmonic (step S107). The second drive mode (4) shown in FIG. 7 is a drive mode in which piezoelectric driver 30 is driven to vibrate protection cover 2 at resonant frequency fr3 of the harmonic, and drive voltage Vdr is set to V2 and drive frequency fdr is set to resonant frequency fr3 of the harmonic. In order to search for resonant frequency fr3 of the harmonic, signal processing circuit 20 drives the piezoelectric driver in a harmonic search mode (3) before the second drive mode (4).

Then, piezoelectric device 40 is operated in a monitoring mode in which a dried state of foreign matter is monitored, although not shown in the second drive mode (4) shown in FIG. 7. In order to have piezoelectric device 40 operate in the monitoring mode, piezoelectric driver 30 applies to piezoelectric body 14, an AC output signal to set drive voltage Vdr to V1 and to sweep frequency f. Then, impedance detector 70 measures as a resonant frequency fr2, a frequency among swept frequency f at which a current in piezoelectric driver 30 is a maximum and measures a current at that time as a current value I2, and signal processing circuit 20 determines amounts of variation (Δfr2 and ΔI2) of measured resonant frequency fr2 and current value (step S108).

Signal processing circuit 20 determines whether or not measured resonant frequency fr2 and current value I2 have stopped or substantially stopped changing (step S109). Specifically, signal processing circuit 20 determines whether or not a relationship of Δfr2 (=fr2(t+1)−fr2(t))=0 and ΔI2 (=I2(t+1)−I2(t))=0 is satisfied. In other words, when a temperature of the foreign matter that is adhered to the surface of protection cover 2 is stabilized and there is no moisture, a mass of the foreign matter (mud) is stabilized and thus there is substantially no variation in measured resonant frequency fr2 and current value I2.

When signal processing circuit 20 determines that measured resonant frequency fr2 and current value I2 are changing (NO in step S109), signal processing circuit 20 returns the process to step S107 and continues driving in the second drive mode. When signal processing circuit 20 determines that measured resonant frequency fr2 and current value I2 hardly change (YES in step S109), signal processing circuit 20 controls piezoelectric device 40 to operate in a third drive mode. Specifically, in order to have piezoelectric device 40 operate in the third drive mode, piezoelectric driver 30 applies to piezoelectric body 14, an AC output signal to set drive voltage Vdr to V2 and set drive frequency fdr to resonant frequency fr1 of a fundamental wave (step S110). The third drive mode (6) shown in FIG. 7 is a drive mode in which piezoelectric driver 30 is driven to vibrate protection cover 2 at resonant frequency fr1 of the fundamental wave, and drive voltage Vdr is set to V2 and drive frequency fdr is set to resonant frequency fr1. By applying vibration at which an amplitude of protection cover 2 becomes larger to foreign matter which is a dried, the dried foreign matter is removed by being shaken off from protection cover 2. In order to search for resonant frequency fr1 of the fundamental wave, signal processing circuit 20 drives the piezoelectric driver in a search mode (5) before the third drive mode (6).

When resonant frequency fr1 does not change when vibration of protection cover 2 in the third drive mode has been performed for a predetermined time period, signal processing circuit 20 can determine that the foreign matter that is adhered to the surface of protection cover 2 has not been successfully shaken off. In other words, signal processing circuit 20 determines whether or not the foreign matter that is adhered to the surface of protection cover 2 has been shaken off based on the measured resonant frequency (step S111).

When signal processing circuit 20 determines that the foreign matter that is adhered to the surface of protection cover 2 has been shaken off (YES in step S111), signal processing circuit 20 returns the process to step S101 and sets drive back to the search mode. When signal processing circuit 20 determines that the foreign matter that is adhered to the surface of protection cover 2 has not been removed by being shaken off (NO in step S111), signal processing circuit 20 sets a fourth drive mode (cleaning solution+vibration) in which cleaning driver 60 is driven to discharge the cleaning solution and piezoelectric driver 30 is also driven. As a result of an operation in the fourth drive mode, signal processing circuit 20 can achieve reinforced cleaning of the foreign matter that is adhered to protection cover 2. After the operation in the fourth drive mode, signal processing circuit 20 returns the process to step S101 and sets drive back to the search mode.

The foreign matter that cannot be removed even after drying can be determined as a highly viscous foreign matter including, for example, oil. Therefore, in step S112, the foreign matter is cleaned by discharging the cleaning solution to protection cover 2. When a coating on protection cover 2 deteriorates, it becomes difficult to shake off the dried foreign matter from protection cover 2. In such a case, a user may be invited to discharge the cleaning solution to protection cover 2 and to maintain the coating on protection cover 2. Furthermore, when signal processing circuit 20 determines that the foreign matter that is adhered to the surface of protection cover 2 has not been successfully removed in a configuration without cleaning solution discharger 50 and cleaning driver 60 (NO in step S111), it may issue to a user, an error indicating that the foreign matter has not successfully been removed.

Figure 10:
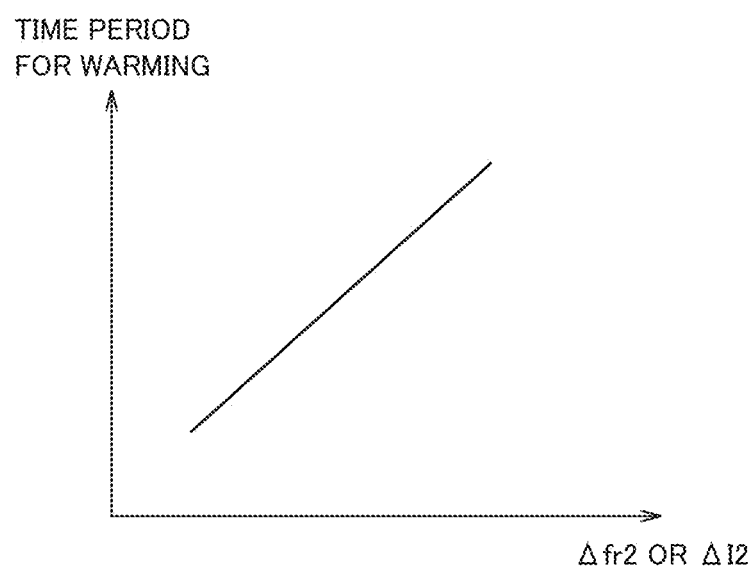
FIG. 10 is a graph showing a relationship between a time period for warming and a difference value of a resonant frequency or a current value.

In the flowchart shown in FIG. 8, whether or not drying of the foreign matter that is adhered to the surface of protection cover 2 has been completed is determined based on the amount of variation ($\Delta$fr2, $\Delta$I2) in resonant frequency fr2 and current value I2 measured in step S109. Determination of whether or not drying of the foreign matter has been completed is not limited to determination based on the amount of variation ($\Delta$fr2, $\Delta$I2). An amount of a foreign matter (mud) that adheres may be estimated and a time period for warming may be determined based thereon. FIG. 10 is a graph showing a relationship between a time period for warming and a difference value ($\Delta$fr, $\Delta$I) of a resonant frequency or a current value. Specifically, an amount of foreign matter (mud) corresponds to the difference value ($\Delta$fr, $\Delta$I) of the resonant frequency or the current value. Therefore, signal processing circuit 20 can estimate the amount of the foreign matter (mud) based on the difference value ($\Delta$fr, $\Delta$I) of the resonant frequency and the current value and the time period for warming is calculated from the graph shown in FIG. 10. In other words, when the amount of the foreign matter (mud) that is adhered is large, signal processing circuit 20 increases a time period for warming.

The cleaning solution often includes alcohol. When a temperature is low, viscosity of the cleaning solution becomes high, and when protection cover 2 is vibrated, it becomes difficult to atomize the cleaning solution. In such a case, viscosity of the cleaning solution can be lowered by warming protection cover 2 in advance to facilitate atomization of the cleaning solution by vibration of protection cover 2.

When protection cover 2 is vibrated at the resonant frequency of the fundamental wave, displacement of the central portion of protection cover 2 is large. It has generally been known that application of ultrasonic vibration to protection cover 2 leads to a smaller angle of contact of foreign matter (droplet) that is adhered to the surface of protection cover 2. Therefore, when protection cover 2 is vibrated at the resonant frequency of the fundamental wave, the angle of contact of the droplet in the central portion of protection cover 2 is small (that is, wettability is high) and the angle of contact of the droplet in a peripheral portion of protection cover 2 remains large. Therefore, the droplet that is adhered to the surface of protection cover 2 is gathered in the central portion with high wettability. By making use of this phenomenon, when discharging the cleaning solution to protection cover 2 vibrated at the resonant frequency of the fundamental wave, the cleaning solution does not have to be discharged to the entire surface of protection cover 2 and thus an amount of use of the cleaning solution can be reduced.

As described above, imaging unit 100 according to the first preferred embodiment includes imaging device 5 and cleaning device 10. Cleaning device 10 includes protection cover 2 in a field of view of imaging device 5, vibrator 12 that vibrates protection cover 2, piezoelectric driver 30 that drives vibrator 12, the determiner that determines whether or not foreign matter is adhered to a surface of protection cover 2, the warmer that warms protection cover 2, and signal processing circuit 20 that controls piezoelectric driver 30. When the determiner determines that the foreign matter is adhered to the surface of protection cover 2, signal processing circuit 20 controls piezoelectric driver 30 such that vibration of protection cover 2 has, for example, a vibration acceleration of about $1.5 \times 10^5$ m/s$^2$. When the determiner determines that the foreign matter is adhered to the surface of protection cover 2 when piezoelectric driver 30 is controlled such that vibration of protection cover 2 has a prescribed vibration acceleration, signal processing circuit 20 causes the warmer to warm protection cover 2. After protection cover 2 is warmed, signal processing circuit 20 controls piezoelectric driver 30 such that vibration of protection cover 2 has a resonant frequency.

Thus, in cleaning device 10 according to the first preferred embodiment, when the determiner determines that the foreign matter is adhered to the surface of protection cover 2 despite vibration of protection cover 2, signal processing circuit 20 causes the warmer to warm protection cover 2. After protection cover 2 is warmed, signal processing circuit 20 controls piezoelectric driver 30 such that vibration of protection cover 2 has the resonant frequency. Therefore, the foreign matter that is adhered to protection cover 2 can be efficiently removed.

Impedance detector 70 that detects a value relating to an impedance of vibrator 12 driven by piezoelectric driver 30 is further included. The determiner (signal processing circuit 20) preferably determines whether or not the foreign matter is adhered to the surface of protection cover 2 based on a change over time in value relating to the impedance detected by impedance detector 70. The determiner can thus determine whether or not foreign matter is adhered to the surface of protection cover 2 and protection cover 2 can be appropriately cleaned.

Preferably, the warmer warms protection cover 2 under control of piezoelectric driver 30 by signal processing circuit 20 such that vibration of protection cover 2 has a higher-order resonant frequency. Protection cover 2 can thus be warmed without separately providing a component for warming such as a heater. Vibration of protection cover 2 at a higher-order resonant frequency is smaller in amplitude of protection cover 2 than vibration at the resonant frequency of the fundamental wave. Therefore, deterioration of a coating on protection cover 2 due to friction against the foreign matter (for example, mud particles contained in a droplet) can be reduced or prevented.

Cleaning nozzle 3 that discharges the cleaning solution to the surface of protection cover 2 is further provided. When the determiner determines that the foreign matter is adhered to the surface of protection cover 2 despite vibration of protection cover 2 after warming, signal processing circuit 20 preferably includes cleaning nozzle 3 to discharge the cleaning solution. Reinforced cleaning of the foreign matter that is adhered to protection cover 2 can thus be achieved.

Preferably, signal processing circuit 20 switches between control for warming of protection cover 2 by the warmer and control of piezoelectric driver 30 such that vibration of protection cover 2 has the resonant frequency, based on a state of the foreign matter during warming. Signal processing circuit 20 can thus further continue warming of protection cover 2 or switch to vibration for shaking off, based on the state of drying of the foreign matter.

Preferably, signal processing circuit 20 monitors the state of the foreign matter during warming based on a change over time in value relating to an impedance detected by impedance detector 70. Signal processing circuit 20 can thus accurately determine the state of drying of the foreign matter.

Cleaning device 10 includes protection cover 2 in a field of view of imaging device 5, vibrator 12 that vibrates protection cover 2, piezoelectric driver 30 that drives vibrator 12, a determiner that determines whether or not foreign matter is adhered to a surface of protection cover 2, and signal processing circuit 20 that controls piezoelectric driver 30. When the determiner determines that the foreign matter is adhered to the surface of protection cover 2, signal processing circuit 20 controls piezoelectric driver 30 such that vibration of protection cover 2 has a vibration acceleration of about $1.5 \times 10^5$ m/s². When the determiner determines that the foreign matter is adhered to the surface of protection cover 2 despite control of piezoelectric driver 30 such that vibration of protection cover 2 has a prescribed vibration acceleration, signal processing circuit 20 controls piezoelectric driver 30 such that vibration of protection cover 2 has a higher-order resonant frequency as the warmer. After vibration of protection cover 2 at the higher-order resonant frequency, signal processing circuit 20 controls piezoelectric driver 30 such that vibration of protection cover 2 has a resonant frequency.

A cleaning method of cleaning a surface of protection cover 2 with cleaning device 10 includes determining whether or not foreign matter is adhered to the surface of protection cover 2, controlling piezoelectric driver 30 such that vibration of protection cover 2 has a vibration acceleration of about $1.5 \times 10^5$ m/s² when it is determined that the foreign matter is adhered to the surface of protection cover 2, warming protection cover 2 with the warmer when it is determined that the foreign matter is adhered to the surface of protection cover 2 despite control of piezoelectric driver 30 such that vibration of protection cover 2 has a prescribed vibration acceleration, and controlling, after protection cover 2 is warmed, piezoelectric driver 30 such that vibration of protection cover 2 has a resonant frequency.

Second Preferred Embodiment

In cleaning device 10 according to the first preferred embodiment, in the first drive mode in which foreign matter that is adhered to the surface of protection cover 2 is cleaned by vibration, drive voltage Vdr is set to V2 (>V1) to apply strong vibration to protection cover 2. In a cleaning device according to a second preferred embodiment of the present invention, the first drive mode in which vibration is weak to such an extent to slip down foreign matter that is adhered to the surface of the protection cover is applied to the protection cover is used.

Figure 11:
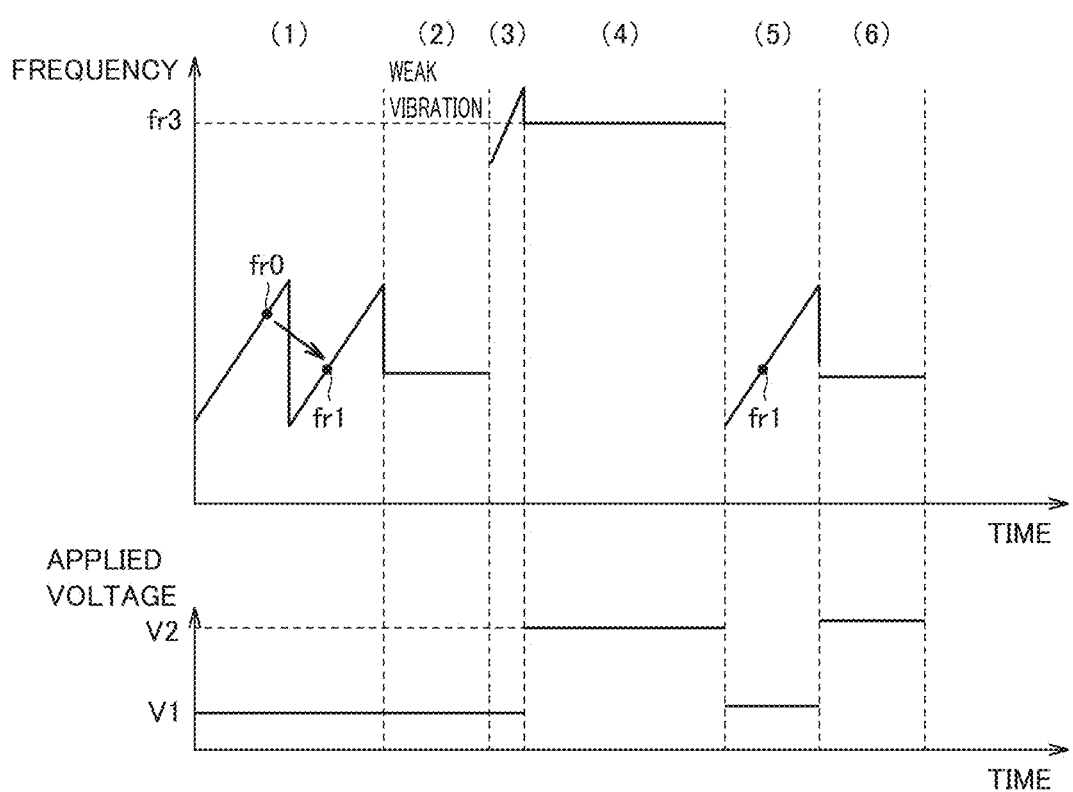
FIG. 11 is a transition diagram of operation modes for illustrating operations of a cleaning device in an imaging unit according to a second preferred embodiment of the present invention.

FIG. 11 is a transition diagram of operation modes for illustrating operations of the cleaning device in the imaging unit according to the second preferred embodiment. Since the imaging unit and the cleaning device according to the second preferred embodiment are the same or substantially the same as the imaging unit and the cleaning device according to the first preferred embodiment, the same or corresponding components are denoted by the same reference numbers and detailed description thereof will not be repeated.

Initially, in the search mode (1), while piezoelectric device 40 operates with drive voltage Vdr being set to V1 and with frequency f being swept, a resonant frequency of piezoelectric device 40 is searched for. In the search mode (1) shown in FIG. 11, the measured resonant frequency is lowered from resonant frequency fr0 to resonant frequency fr1, and signal processing circuit 20 determines that the foreign matter is adhered to the surface of protection cover 2.

When signal processing circuit 20 determines that the foreign matter is adhered to the surface of protection cover 2, it controls piezoelectric device 40 to operate in the first drive mode. In the first drive mode in the second preferred embodiment, a weak vibration mode is applied. In other words, in the weak vibration mode, piezoelectric driver 30 is controlled such that vibration of protection cover 2 has a vibration acceleration not less than about $1.5 \times 10^5$ m/s² and not more than about $8.0 \times 10^5$ m/s² to reduce or prevent the amplitude of protection cover 2, for example, to about 5.5 μm or smaller. By vibrating protection cover 2 in the weak vibration mode, foreign matter such as a droplet low in viscosity that is adhered to the surface of protection cover 2 is slipped down and cleaned.

Figure 12:
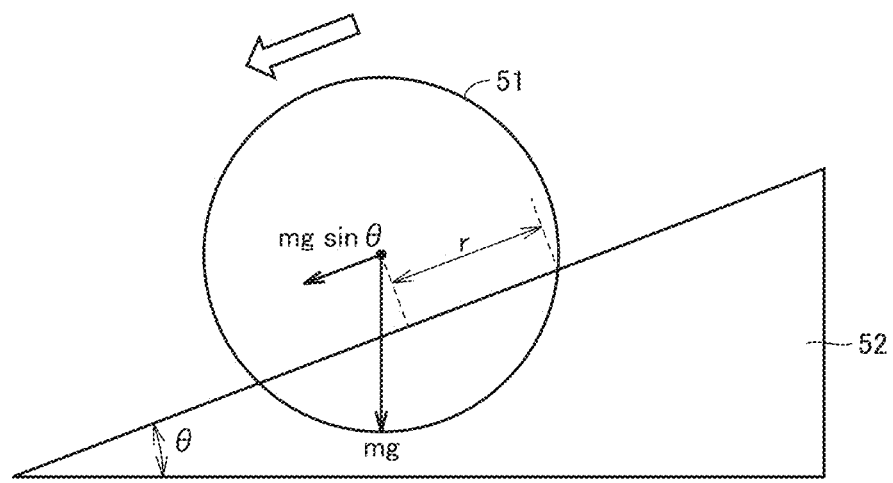
FIG. 12 is a schematic diagram illustrating an exemplary relationship between a sliding angle and adhesive energy.

Principles of slipping down a foreign matter by vibration of protection cover 2 in the weak vibration mode will be described. Initially, a relationship between a sliding angle and adhesive energy will be described. The sliding angle refers to an angle between a horizontal plane and a surface of a solid when a droplet is adhered to a horizontal surface of the solid and starts sliding downward as the surface of the solid is gradually inclined from a horizontal state. FIG. 12 is a schematic diagram illustrating an exemplary relationship between a sliding angle and adhesive energy.

A relationship shown in FIG. 12 can be expressed in a mathematical expression of adhesive energy proposed by Wolfram.

$$E = \frac{mg\sin\theta}{2\pi r}$$

In the expression above, E represents adhesive energy, r represents a contact radius, m represents a mass of a droplet, g represents acceleration of gravity, and θ represents a sliding angle. The mathematical expression was experimentally found based on proportionality of sliding angle θ between water and paraffin to a radius r of a surface of contact between a droplet 51 and a solid 52, and assumes that a component of gravity of droplet 51 in a direction of inclination and adhesive force applied to a peripheral portion of an osculating circle are in balance. This indicator is regarded as an evaluation indicator uniquely determined only by a combination between a liquid and a solid, without being experimentally dependent on an amount of liquid or an angle of inclination.

It can be seen in the mathematical expression that adhesive energy E decreases as sliding angle θ decreases. In other words, as sliding angle θ is reduced, droplet 51 is less likely to adhere to the surface of the solid.

In cleaning device 10, by vibrating protection cover 2 at a prescribed vibration acceleration, sliding angle θ is reduced and adhesive energy E with which the droplet remains at the surface of protection cover 2 is reduced. Removal of the droplet that is adhered to protection cover 2 is thus facilitated.

Figure 13:
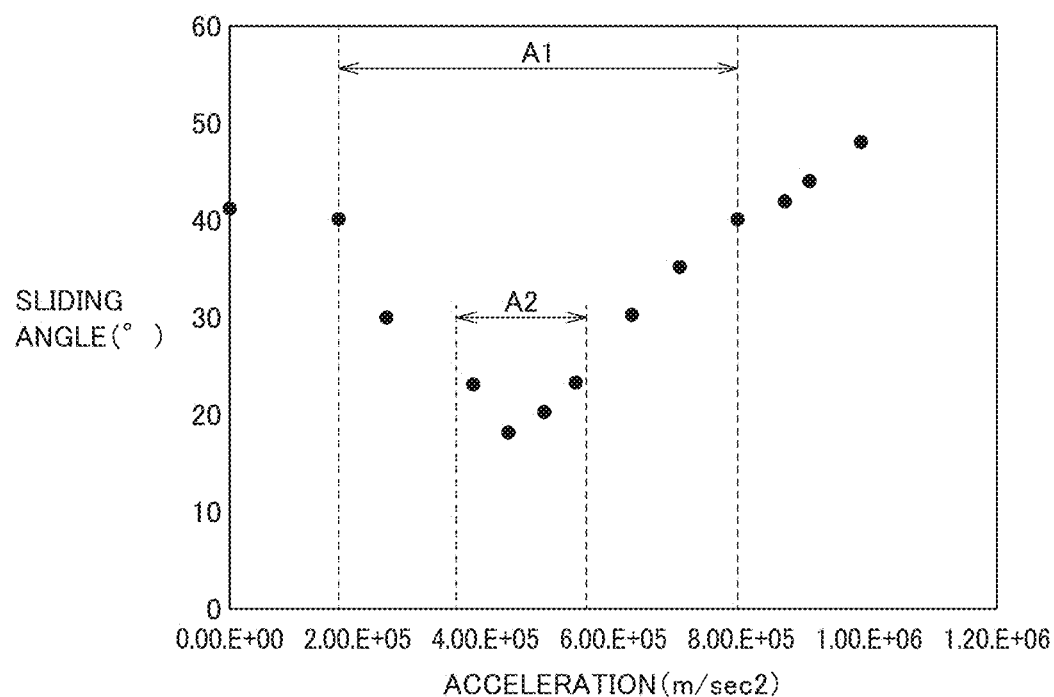
FIG. 13 is a schematic diagram showing an exemplary relationship between a sliding angle and an acceleration.

FIG. 13 is a schematic diagram showing an exemplary relationship between a sliding angle and a vibration acceleration. FIG. 13 shows changes in sliding angle with changes in vibration acceleration. The vibration acceleration is calculated with a method described below.

Vibration was excited by supplying a signal to piezoelectric body 14 of vibrator 12 having a resonant frequency of about 60 kHz by using a power supply (E26104 manufactured by Keysight Technologies) and a function generator (AGF1022 manufactured by Tektronix, Inc.). Displacement of protection cover 2 excited by vibration of vibrator 12 was detected by a laser displacement gauge (BX51M manufactured by Olympus Corporation) and measured with a multimeter (2110 manufactured by Keysight Technologies) and an oscilloscope (TBS1104 manufactured by Tektronix, Inc.). A vibration acceleration was calculated based on an expression $\alpha = (2\pi f)2A$, where α represents a vibration acceleration, f represents a frequency, and A represents an amplitude (an amount of displacement).

As shown in FIG. 13, when vibration acceleration α is not less than about $1.5 \times 10^5$ m/s² and not more than about $8.0 \times 10^5$ m/s², for example, sliding angle θ is not larger than about 40 degrees (see "A1" in FIG. 13). When sliding angle θ is not larger than about 40 degrees, adhesive energy E of a droplet is lower than a force of slip down from the surface of protection cover 2 down to the outside. Therefore, the droplet is not gathered to a portion of protection cover 2 where an amount of displacement is largest, that is, the central portion of protection cover 2, but the droplet flows to the outside of protection cover 2. Performance of removal of the droplet is thus improved.

When vibration acceleration α is not less than about $3.5 \times 10^5$ m/s² and not more than about $5.5 \times 10^5$ m/s², for example, sliding angle θ is not larger than about 22 degrees (see "A2" in FIG. 13). When sliding angle θ is not larger than about 22 degrees, adhesive energy E of the droplet is further reduced. Therefore, the droplet more readily flows to the outside of protection cover 2 and performance of removal of the droplet is further improved.

When vibration acceleration α is less than about $1.5 \times 10^5$ m/s² or more than about $8.0 \times 10^5$ m/s², sliding angle θ is greater than about 40 degrees. When sliding angle θ is greater than about 40 degrees, adhesive energy E of the droplet is higher than force of slip down from the surface of protection cover 2 down to the outside. Therefore, the droplet is gathered to a portion of protection cover 2 where the amount of displacement is largest, that is, the central portion of protection cover 2.

Therefore, vibration acceleration α is preferably not less than about $1.5 \times 10^5$ m/s² and not more than about $8.0 \times 10^5$ m/s², for example. Vibration acceleration α is more preferably not less than about $3.5 \times 10^5$ m/s² and not more than about $5.5 \times 10^5$ m/s², for example. By controlling vibration acceleration α to be within such a prescribed range, slip performance of the droplet that is adhered to the surface of protection cover 2 is improved as compared with an example in which the vibration acceleration is in another range.

In slipping down a foreign matter by vibration of protection cover 2 in the weak vibration mode, the amplitude of protection cover 2 can be smaller than in atomization of the droplet by vibration of protection cover 2 in the weak vibration mode as in the first preferred embodiment. Since the amplitude can be smaller in the weak vibration mode, deterioration of a coating on protection cover 2 due to friction against mud particles contained in a droplet can be reduced or prevented.

The first drive mode (2) shown in FIG. 11 is a drive mode in which cleaning driver 60 is not driven but only piezoelectric driver 30 is driven, and drive voltage Vdr is set to V1 and drive frequency fdr is set to resonant frequency fr1 of the fundamental wave. Although drive voltage Vdr in the first drive mode (2) is set to V1 which is the same as in the search mode, the drive voltage may be set to any voltage without being limited to V1 as long as drive voltage Vdr can achieve vibration acceleration α not less than about $1.5 \times 10^5$ m/s² and not more than about $8.0 \times 10^5$ m/s², for example.

By vibrating protection cover 2 in the weak vibration mode, foreign matter such as a droplet low in viscosity that is adhered to the surface of protection cover 2 slips down and a very small water droplet or mud water high in viscosity remains. For remaining foreign matter, signal processing circuit 20 drives the piezoelectric driver in the second drive mode to heat protection cover 2. The second drive mode (4) shown in FIG. 11 is a drive mode in which piezoelectric driver 30 is driven to vibrate protection cover 2 at resonant frequency fr3 of the harmonic, and drive voltage Vdr is set to V2 and drive frequency fdr is set to resonant frequency fr3. In order to search for resonant frequency fr3 of the harmonic, signal processing circuit 20 drives the piezoelectric driver in the harmonic search mode (3) before the second drive mode (4).

By vibrating protection cover 2 in the weak vibration mode, a large droplet (including also mud water) that is adhered to the surface of protection cover 2 slips down and thus a small water droplet or mud water that remains on the surface of protection cover 2 can be quickly dried by heating in the second drive mode.

The third drive mode (6) shown in FIG. 11 is a drive mode in which piezoelectric driver 30 is driven to vibrate protection cover 2 at resonant frequency fr1 of the fundamental wave, and drive voltage Vdr is set to V2 and drive frequency fdr is set to resonant frequency fr1. In order to search for resonant frequency fr1 of the fundamental wave, signal processing circuit 20 drives the piezoelectric driver in the search mode (5) before the third drive mode (6). In the third drive mode (6), drive voltage Vdr is set to V2 higher than V1 in the first drive mode (2) so as to increase the amplitude of protection cover 2, so that a dried foreign matter is removed by being shaken off from protection cover 2. Higher vibration energy during shaking off the foreign matter facilitates fall-off of the dried foreign matter.

As set forth above, in cleaning device 10 according to the first preferred embodiment, signal processing circuit 20 controls piezoelectric driver 30 such that the amplitude (first drive mode (2)) of protection cover 2 yet to be warmed is smaller than the amplitude (third drive mode (6)) of the warmed protection cover 2. In particular, preferably, signal processing circuit 20 controls piezoelectric driver 30 such that vibration of protection cover 2 yet to be warmed has a vibration acceleration not less than about $1.5 \times 10^5$ m/s² and not more than about $8.0 \times 10^5$ m/s², for example.

Since the amplitude of protection cover 2 yet to be warmed is smaller than the amplitude of warmed protection cover 2, cleaning device 10 according to the second preferred embodiment can reduce or prevent deterioration of a coating on protection cover 2 due to friction against mud particles included in a droplet. In vibration of protection cover 2 in the weak vibration mode, as compared with an example of strong vibration of protection cover 2 as in the first preferred embodiment, the droplet that remains on the surface of protection cover 2 is not dried in the central portion but is dried in a distribution over the surface. Therefore, in shaking off the foreign matter dried in the third drive mode from protection cover 2, scraping of the coating by friction against the dried foreign matter can be uniform over the entire or substantially the entire surface, without being localized in the central portion of protection cover 2.

Third Preferred Embodiment

In cleaning device 10 according to the first preferred embodiment, when it is determined that measured resonant frequency fr2 and current value I2 hardly change, it is determined that drying of foreign matter that is adhered to the surface of protection cover 2 has been completed. In the cleaning device according to a third preferred embodiment of the present invention, it can be determined that drying of foreign matter that is adhered to the surface of protection cover 2 has been completed by using a characteristic that moisture in mud water gradually volatilizes and a mass thereof decreases during warming and the mass is quickly stabilized when moisture completely disappears.

Figure 14:
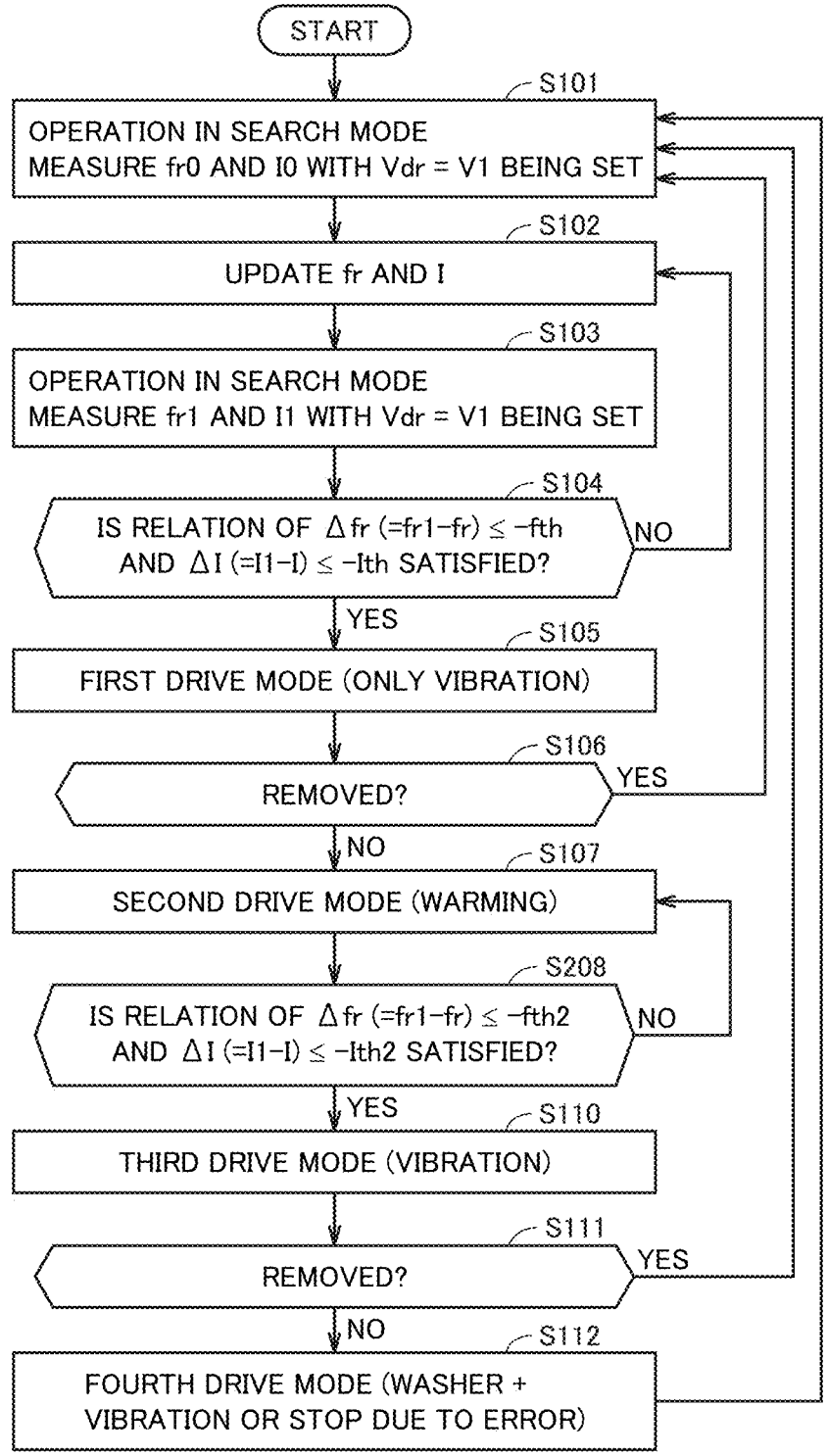
FIG. 14 is a flowchart for illustrating operations of a cleaning device in an imaging unit according to a third preferred embodiment of the present invention.

FIG. 14 is a flowchart for illustrating operations of the cleaning device in the imaging unit according to the third preferred embodiment. Since the imaging unit and the cleaning device according to the third preferred embodiment are the same or substantially the same in the imaging unit and the cleaning device according to the first preferred embodiment, the same or corresponding components are denoted by the same reference numbers and detailed description will not be repeated.

In the third preferred embodiment, whether or not drying of foreign matter that is adhered to the surface of protection cover 2 has been completed is determined in step S208 shown in FIG. 14, instead of steps S108 and S109 shown in FIG. 8. Since the flowchart shown in FIG. 14 is the same in processing as the flowchart shown in FIG. 8 except for step S208, the same processing is denoted by the same step number and detailed description will not be repeated.

Specifically, in step S208, signal processing circuit 20 regularly provides in the second drive mode (warming), a monitoring mode in which a state of drying of foreign matter is monitored. In other words, signal processing circuit 20 monitors the state of drying of the foreign matter by sensing a change in mass of the foreign matter based on a combination of a change in resonant frequency of piezoelectric device 40 and a change in minimum impedance of piezoelectric device 40.

Signal processing circuit 20 calculates difference values between frequency fr and current value I as reference values updated in step S102 and resonant frequency fr1 and current value I1 measured in the second drive mode (warming), and compares the difference values with predetermined threshold values fth2 (<fth) and Ith2 (<Ith) (step S208). Signal processing circuit 20 determines whether or not a relationship of $\Delta fr$ (=fr1−fr)≤−fth2 and $\Delta I$ (=I1−I)≤−Ith2 is satisfied. In other words, when an amount of change ($\Delta fr$) of decrease in resonant frequency is not larger than threshold value fth2 and an amount of change ($\Delta I$) of decrease in current value is not larger than threshold value Ith2, signal processing circuit 20 determines whether or not drying of the foreign matter that is adhered to the surface of protection cover 2 has been completed.

When the difference values are larger than predetermined threshold values fth2 and Ith2 (NO in step S208), signal processing circuit 20 returns the process to step S107 and continues driving in the second drive mode. When the difference values are not larger than predetermined threshold values fth2 and Ith2 (YES in step S208), signal processing circuit 20 controls piezoelectric device 40 to operate in the third drive mode. In the third drive mode, the dried foreign matter is removed by being shaken off from protection cover 2. Since moisture in mud water gradually volatilizes and a mass thereof decreases during warming, threshold values fth2 and Ith2 are smaller than threshold values fth and Ith on which determination as to adhesion of foreign matter is based. Without application of vibration in the third drive mode after drying of the foreign matter, the foreign matter may detach and drop under its own weight. In that case, the difference values ($\Delta fr$ and $\Delta I$) are substantially 0 (zero), and thus signal processing circuit 20 can determine whether the foreign matter that is adhered to the surface of protection cover 2 remains or has come off.

Figure 15:
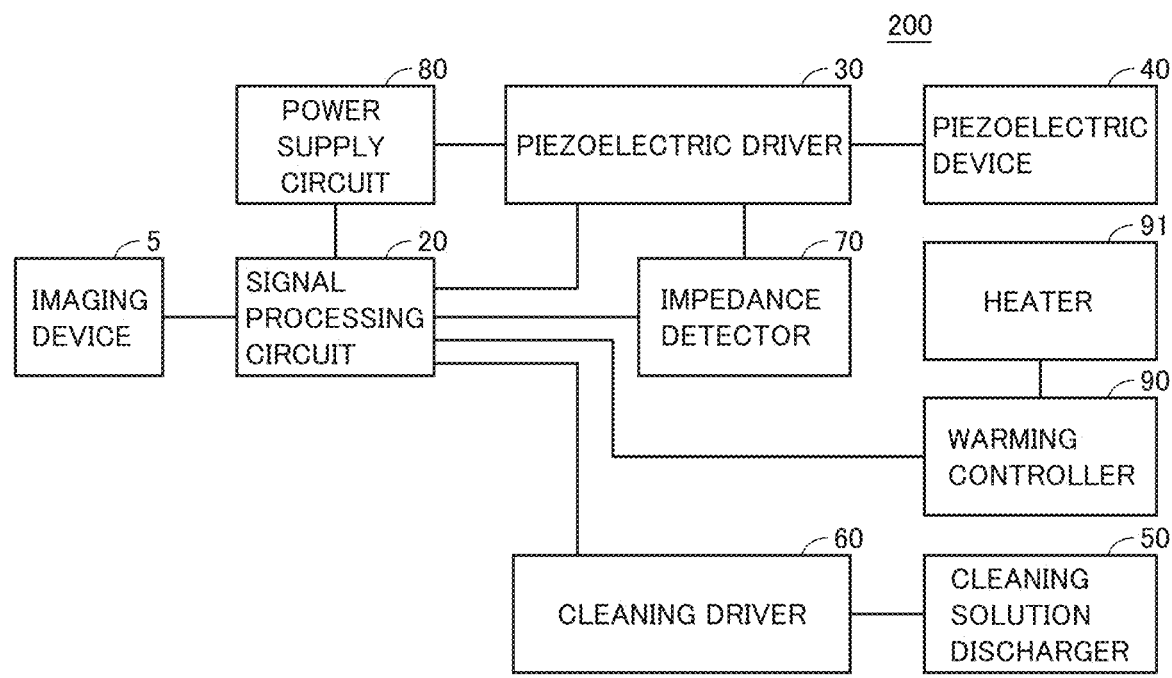
FIG. 15 is a block diagram for illustrating control of the cleaning device in an imaging unit according to a modification of a preferred embodiment of the present invention.

In the cleaning devices according to preferred embodiments described above, to warm protection cover 2 through operations in the second drive mode, protection cover 2 is vibrated at resonant frequency fr3 of the harmonic, and by using mechanical loss of vibration, protection cover 2 is warmed. Without being limited thereto, a warmer such as, for example, a heater to heat may be provided in protection cover 2. FIG. 15 is a block diagram for illustrating control of the cleaning device in an imaging unit 200 according to a modification of a preferred embodiment of the present invention. Since the block diagram shown in FIG. 15 is the same or substantially the same as the block diagram shown in FIG. 5, except for providing a warming controller 90 and a heater 91, the same or corresponding components are denoted by the same reference numbers and detailed description will not be repeated.

Figure 16:
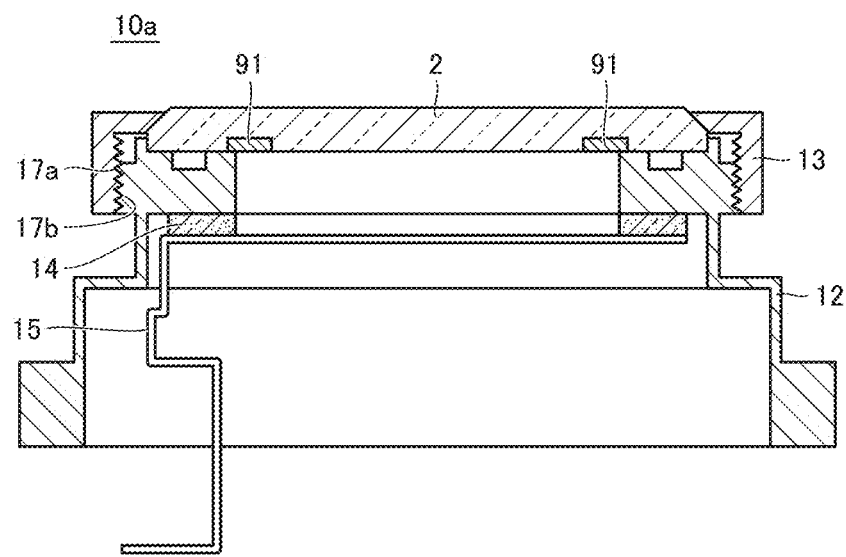
FIG. 16 is a schematic cross-sectional view showing a cross-sectional construction of a cleaning device in which a heater is provided in a protection cover.

Warming controller 90 controls a current to be supplied to the heater based on a control signal indicating warming of protection cover 2 from signal processing circuit 20. Heater 91 is provided in a peripheral portion (outside of a range of imaging by imaging device 5) of protection cover 2. FIG. 16 is a schematic cross-sectional view showing a cross-sectional construction of a cleaning device 10*a* in which heater 91 is provided in protection cover 2. Since the schematic cross-sectional view of cleaning device 10*a* shown in FIG. 16 is the same as the schematic cross-sectional view of cleaning device 10 shown in FIG. 2, except for heater 91, the same or corresponding component has the same reference number and detailed description will not be repeated.

Figure 17:
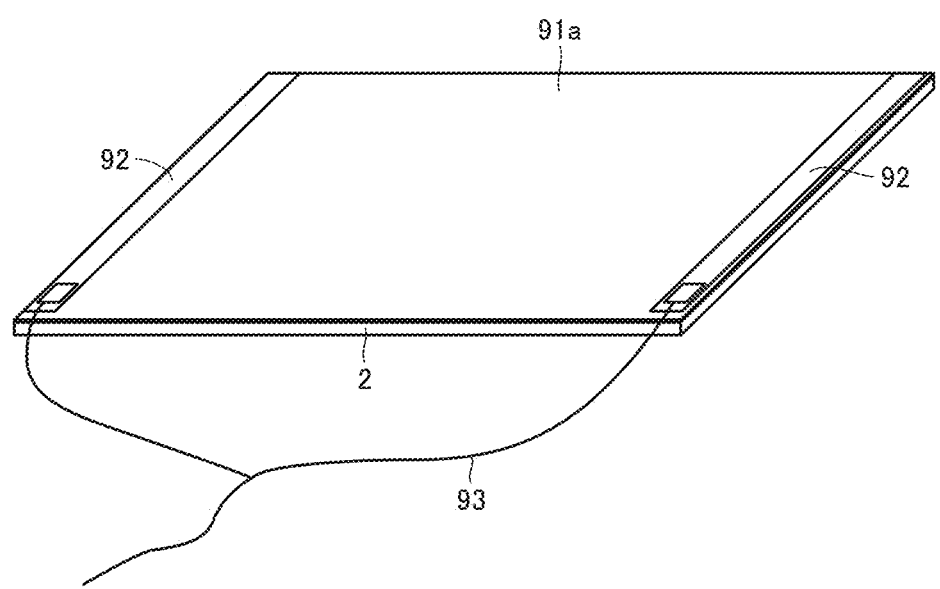
FIG. 17 is a schematic diagram showing a construction including a transparent electrode for the heater provided in the protection cover.

Heater 91 is, for example, a heating wire heater with a doughnut shape, and bonded to the peripheral portion of protection cover 2. Heater 91 may be made, for example, of a Nichrome wire. A transparent electrode (for example, ITO) which does not block a range of imaging by imaging device 5 can also be used for the heater. FIG. 17 is a schematic diagram showing a transparent electrode for the heater provided in protection cover 2. A transparent electrode 91*a* is provided on the entire or substantially the entire surface of protection cover 2 shown in FIG. 17 and a terminal 92 electrically connected to transparent electrode 91*a* is provided at an end of protection cover 2. Terminal 92 is electrically connected to warming controller 90 through a line 93. Therefore, a current from warming controller 90 is supplied to transparent electrode 91*a* through line 93 and terminal 92 so that transparent electrode 91*a* generates heat, with which protection cover 2 can be warmed.

The method of warming protection cover 2 is not limited to a directly warming protection cover 2 such as a heater, and indirect warming such as warming using an infrared light source or warming by using warm air may be applicable. When warming with an infrared light source, a property of glass of protection cover 2 to absorb infrared rays is used, and glass is heated by irradiation of glass with infrared rays from the infrared light source provided in the vicinity of the imaging device. In general, infrared rays having a long wavelength (for example, equal to or longer than about 2 μm) are absorbed as heat without passing through glass, with infrared absorption loss by a glass skeleton being dominant.

For the imaging unit according to the preferred embodiments described previously, in particular, a configuration of imaging device 5 is not described in detail. However, for example, a camera, a LiDAR, or a radar may be included as imaging device 5.

Although cleaning by vibration of protection cover 2 and cleaning by discharge of the cleaning solution from cleaning solution discharger 50 are illustrated in the cleaning device in the imaging unit according to the preferred embodiments described previously, limitation thereto is not intended. For example, foreign matter that is adhered to the surface of protection cover 2 may be removed by cleaning by discharge of air from cleaning solution discharger 50.

Although the imaging units according to the preferred embodiments described previously are described as including a single cleaning nozzle 3 in housing 1 as shown in FIG. 1, without being limited as such, a plurality of cleaning nozzles 3 may be provided in housing 1.

The imaging units according to the preferred embodiments described previously are not limited to the imaging unit provided in a vehicle, and an imaging unit for an application in which a translucent body arranged in a field of view of imaging device 5 should be cleaned can also similarly be applied.

In the imaging units according to the preferred embodiments described previously, signal processing circuit 20 determines whether or not foreign matter is adhered to the surface of protection cover 2 based on a combination of a change in resonant frequency and a change in minimum impedance of piezoelectric device 40. Without being limited as such, signal processing circuit 20 may determine whether or not foreign matter is adhered to the surface of protection cover 2 based on an image picked up by imaging device 5. Specifically, a change over time of an image picked up by imaging device 5 defines and functions as one of pieces of image information of imaging device 5 on which determination by signal processing circuit 20 as adhesion of foreign matter to the surface of protection cover 2 is based, and a change over time in brightness in an image picked up by imaging device 5 represents one example. Without being limited as such, for example, blur of an edge of a picked-up image may be evaluated as a change over time of an image picked up by imaging device 5 based on a frequency spectrum representing one of image processing and determination as adhesion of a foreign matter to the surface of protection cover 2 may be made based on a change over time in frequency spectrum.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning device comprising:
   a translucent body in a field of view of an imaging device;
   a vibrator to vibrate the translucent body;
   a driver to drive the vibrator;
   a determiner to determine whether foreign matter is adhered to a surface of the translucent body;
   a warmer to warm the translucent body; and
   a controller to control the driver and the warmer, wherein
   when the determiner determines that the foreign matter is adhered to the surface of the translucent body, the controller is configured or programmed to control the driver such that vibration of the translucent body has a vibration acceleration of about $1.5 \times 10^5$ m/s$^2$,
   when the determiner determines that the foreign matter is adhered to the surface of the translucent body in spite of control of the driver such that vibration of the translucent body has a prescribed vibration acceleration, the controller is configured or programmed to control the warmer to warm the translucent body, and
   after the translucent body is warmed, the controller is configured or programmed to control the driver such that vibration of the translucent body has a resonant frequency.

2. The cleaning device according to claim 1, further comprising;
   a detector to detect a value relating to an impedance of the vibrator driven by the driver; wherein
   the determiner determines that the foreign matter is adhered to the surface of the translucent body based on a change over time in value relating to the impedance detected by the detector.

3. The cleaning device according to claim 1, wherein
   the warmer warms the translucent body under control of the driver by the controller such that vibration of the translucent body has a higher-order resonant frequency.

4. The cleaning device according to claim 1, wherein
   the controller is configured or programmed to control the driver such that an amplitude of the translucent body that is not warmed is smaller than an amplitude of the translucent body that is warmed.

5. The cleaning device according to claim 4, wherein
the controller controls the driver such that vibration of the translucent body that is not warmed has a vibration acceleration not less than about $1.5\times10^5$ m/s$^2$ and not more than about $8.0\times10^5$ m/s$^2$.

6. The cleaning device according to claim 1, further comprising:
a discharger to discharge a cleaner to the surface of the translucent body; wherein
when the determiner determines that the foreign matter is adhered to the surface of the translucent body when vibration of the translucent body is performed after warming, the controller is configured or programmed to control the discharger to discharge the cleaner.

7. The cleaning device according to claim 1, wherein
the controller is configured or programmed to switch between control to warm the translucent body by the warmer and control of the driver such that vibration of the translucent body has the resonant frequency, based on a state of the foreign matter during warming.

8. The cleaning device according to claim 7, wherein
the controller is configured or programmed to monitor a state of the foreign matter during warming based on a change over time in a value relating to an impedance detected by a detector.

9. An imaging unit comprising:
an imaging device; and
the cleaning device according to claim 1.

10. The imaging unit according to claim 9, further comprising:
a detector to detect a value relating to an impedance of the vibrator driven by the driver; wherein
the determiner determines that the foreign matter is adhered to the surface of the translucent body based on a change over time in value relating to the impedance detected by the detector.

11. The imaging unit according to claim 9, wherein the warmer warms the translucent body under control of the driver by the controller such that vibration of the translucent body has a higher-order resonant frequency.

12. The imaging unit according to claim 9, wherein the controller is configured or programmed to control the driver such that an amplitude of the translucent body that is not warmed is smaller than an amplitude of the translucent body that is warmed.

13. The imaging unit according to claim 12, wherein the controller is configured or programmed to control the driver such that vibration of the translucent body that is not warmed has a vibration acceleration not less than about $1.5\times10^5$ m/s$^2$ and not more than about $8.0\times10^5$ m/s$^2$.

14. The imaging unit according to claim 9, further comprising:
a discharger to discharge a cleaner to the surface of the translucent body; wherein
when the determiner determines that the foreign matter is adhered to the surface of the translucent body when vibration of the translucent body is performed after warming, the controller is configured or programmed to control the discharger to discharge the cleaner.

15. The imaging unit according to claim 9, wherein the controller is configured or programmed to switch between control to warm the translucent body by the warmer and control of the driver such that vibration of the translucent body has the resonant frequency, based on a state of the foreign matter during warming.

16. The imaging unit according to claim 15, wherein the controller is configured or programmed to monitor a state of the foreign matter during warming based on a change over time in a value relating to an impedance detected by a detector.

17. A cleaning device comprising:
a translucent body in a field of view of an imaging device;
a vibrator to vibrate the translucent body;
a driver to drive the vibrator;
a determiner to determine whether foreign matter is adhered to a surface of the translucent body; and
a controller to control the driver, wherein
when the determiner determines that the foreign matter is adhered to the surface of the translucent body, the controller is configured or programmed to control the driver such that vibration of the translucent body has a vibration acceleration of about $1.5\times10^5$ m/s$^2$,
when the determiner determines that the foreign matter is adhered to the surface of the translucent body when the controller controls the driver such that vibration of the translucent body has a prescribed vibration acceleration, the controller is configured or programmed to control the driver such that vibration of the translucent body has a higher-order resonant frequency, and
after the translucent body is vibrated at the higher-order resonant frequency, the controller is configured or programmed to control the driver such that vibration of the translucent body has a resonant frequency.

18. An imaging unit comprising:
an imaging device; and
the cleaning device according to claim 17.

19. A cleaning method of cleaning a surface of a translucent body with a cleaning device, the cleaning device including a translucent body in a field of view of an imaging device, a vibrator to vibrate the translucent body, a driver to drive the vibrator, and a warmer that to warm the translucent body, the cleaning method comprising:
determining whether foreign matter is adhered to the surface of the translucent body;
controlling the driver such that vibration of the translucent body has a vibration acceleration of about $1.5\times10^5$ m/s$^2$ when it is determined that the foreign matter is adhered to the surface of the translucent body;
warming the translucent body with the warmer when it is determined that the foreign matter is adhered to the surface of the translucent body when the driver is controlled such that vibration of the translucent body has a prescribed vibration acceleration; and
controlling, after the translucent body is warmed, the driver such that vibration of the translucent body has a resonant frequency.

* * * * *